United States Patent
Nagata et al.

(10) Patent No.: US 7,992,212 B2
(45) Date of Patent: Aug. 2, 2011

(54) MOBILE TERMINAL AND GATEWAY FOR REMOTELY CONTROLLING DATA TRANSFER FROM SECURE NETWORK

(75) Inventors: Nami Nagata, Kawasaki (JP); Takao Mohri, Kawasaki (JP); Hideki Mitsunobu, Kawasaki (JP); Shigeki Fukuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 994 days.

(21) Appl. No.: 11/892,142

(22) Filed: Aug. 20, 2007

(65) Prior Publication Data

US 2008/0095373 A1    Apr. 24, 2008

(30) Foreign Application Priority Data

Oct. 19, 2006 (JP) .................................. 2006-285564

(51) Int. Cl.
*G06F 7/04* (2006.01)
*G06F 17/30* (2006.01)
*H04N 7/16* (2011.01)
*G06F 15/167* (2006.01)
*G06F 15/16* (2006.01)
*G06F 21/00* (2006.01)

(52) U.S. Cl. .......... 726/27; 709/213; 709/216; 709/218; 705/51

(58) Field of Classification Search ............... 726/26–30; 709/213–218; 705/51
See application file for complete search history.

(56) References Cited

U.S. PATENT DOCUMENTS

| | | | |
|---|---|---|---|
| 7,165,224 B2 * | 1/2007 | Pyhalammi | 715/748 |
| 7,596,592 B2 * | 9/2009 | Mason et al. | 709/203 |
| 2002/0184318 A1 * | 12/2002 | Pineau | 709/206 |
| 2004/0093375 A1 * | 5/2004 | Mason et al. | 709/203 |
| 2005/0102507 A1 * | 5/2005 | Sozzani et al. | 713/165 |
| 2006/0171340 A1 * | 8/2006 | Maeda et al. | 370/310 |
| 2006/0272032 A1 * | 11/2006 | Jogand-Coulomb et al. | 726/30 |
| 2007/0168458 A1 * | 7/2007 | Costa-Requena et al. | 709/217 |
| 2007/0288551 A1 * | 12/2007 | Sidon | 709/203 |
| 2008/0256368 A1 * | 10/2008 | Ross et al. | 713/193 |

OTHER PUBLICATIONS

Patent Abstract of Japan, Japanese Publication No. 2005-174317, Published Jun. 30, 2005.
Patent Abstract of Japan, Japanese Publication No. 09-223050, Published Aug. 26, 1997.
Patent Abstract of Japan, Japanese Publication No. 2001-005746, Published Jan. 12, 2001.
Patent Abstract of Japan, Japanese Publication No. 2002-108680, Published Apr. 12, 2002.

* cited by examiner

*Primary Examiner* — Christian LaForgia
(74) *Attorney, Agent, or Firm* — Staas & Halsey LLP

(57) ABSTRACT

A data transfer system including mobile terminals and gateways for transferring data from a secure network to an external network under remote control using the mobile terminals. A first gateway produces and sends a first key to a second gateway through first and second mobile terminals. The second gateway produces and sends a second key to the first gateway through the first and second mobile terminals. Then the first mobile terminal issues a data download command, which is forwarded from the second mobile terminal to the second gateway. In response to this data download command, the second gateway sends a file request including the first and second keys to the first gateway over a broadband channel.

12 Claims, 38 Drawing Sheets

41  DEVICE INFORMATION

```
DEVICE NAME: FFF FILE SERVER
DEVICE TYPE: FILE SERVER
MANUFACTURER: FFF LTD
ID: 6bd0732-dfe1-703b-1ce5-26b26010b739
ACCESS URL: http://fileserver.uvw.xyz/
```

44 DATA LIST

RESPONSE TO REQUEST (VIEW DATA LIST)
LIST ENTRY: 3
- FOLDER: NEWS AT NOON: (http://fileserver.uvw.xyz/srvr/contents/······)
- VIDEO: FOOTBALL TODOROKI STADIUM (http://fileserver.uvw.xyz/srvr/contents/?contentsID=123)
- VIDEO: CHESS CHAMPIONSHIP ROUND#3 (http://fileserver.uvw.xyz/srvr/contents/···)

45 CONNECTION REQUEST

ACTION: PERMISSION
CONTENT: http://fileserver.uvw.xyz/srvr/contents/?contentsID=123
DEVICE ID: 5aeb9621-ced0-692a-0bc4-15a15909a625

FIG. 16

46   FIRST ACCESS TICKET

```
TICKET DATA: 164687037383013456813047309A
EXPIRATION DATE: 2006/07/27 18:54:00
```

FIG. 17

47  TICKET REQUEST

```
ACTION: ISSUE TICKET
DEVICE ID: 5aeb9621-ced0-692a-0bc4-15a15909a625

ACCESS TICKET
  TICKET DATA:
  1646870373830134568130473094
  EXPIRATION DATE: 2006/07/27 18:54:00
```

46  FIRST ACCESS TICKET

FIG. 18

430  TICKET MANAGEMENT TABLE

| DEVICE ID | FIRST TICKET DATA | SECOND TICKET DATA |
|---|---|---|
| 5aeb9621-ced0-692a-0bc4-15a15909a625 | 1646870373830134568130473094 | 1478789200.2352920708040961004 |
| ⋮ | ⋮ | ⋮ |

FIG. 19

48  SECOND ACCESS TICKET

TICKET DATA: 1478789200.2352920708040961004
EXPIRATION DATE: 2006/07/27 18:55:00

FIG. 20

350 TICKET MANAGEMENT TABLE

| DEVICE ID | FIRST ACCESS TICKET | | SECOND ACCESS TICKET | |
|---|---|---|---|---|
| | DATA | EXPIRATION DATE | DATA | EXPIRATION DATE |
| 5aeb9621-ced0-692a-0bc4-15a15909a625 | 16468703738301 34568130473094 | 2006/07/27 18:54:00 | 14787892200.23529 20708040961004 | 2006/07/27 18:55:00 |
| 69caa943d9c3-3210-7050-0024f2995c56 | 15867052229967127 74133720498753887 | 2006/07/27 19:37:00 | | |
| ... | ... | ... | ... | ... |

FIG. 21

49   DATA DOWNLOAD COMMAND

ACTION: DOWNLOAD
CONTENT: http://fileserver.uvw.xyz/srvr/contents/?contentsID=123

FIG. 22

51 FILE REQUEST

ACTION: DOWNLOAD
CONTENT: http://fileserver.uvw.xyz/srvr/contents/?contentsID=123

FIG. 25

50 FILE REQUEST

ACTION: DOWNLOAD
CONTENT: /mediaserver/contents/?contentsID=123
DEVICE ID: 5aeb9621-ced0-692a-0bc4-15a15909a625

FIG. 33

71   DATA UPLOAD COMMAND

```
ACTION: UPLOAD
CONTENT: /mediaserver/contents/?contentsID=123
SHARED STORAGE DEVICE: ftp://shared.server.ftp.xyz/pub/video
ENCRYPTION KEY: VRwcAoJ3tPs58Obak2mCO2F8Pgih22aFztCIKUE5J
```

FIG. 34

56 DATA DOWNLOAD COMMAND

```
ACTION: DOWNLOAD
DATA URL: ftp://shared.server.ftp.xyz/pub/video/football.wmv
ENCRYPTION KEY: VRwcAoJ3tPs58Obak2mCO2F8Pgih22aFztClKUE5J
```

FIG. 37

57  DATA DOWNLOAD COMMAND

```
ACTION: DOWNLOAD
DATA URL: ftp://shared.server.ftp.xyz/pub/video/football.wmv
ENCRYPTION KEY: VRwcAoJ3tPs58Obak2mCO2F8Pgih22aFztClKUE5J
DEVICE ID: 5aeb9621-ced0-692a-0bc4-15a15909a625
```

FIG. 38

MOBILE TERMINAL AND GATEWAY FOR REMOTELY CONTROLLING DATA TRANSFER FROM SECURE NETWORK

CROSS-REFERENCE TO RELATED APPLICATIONS

This application is based upon and claims the benefits of priority from the prior Japanese Patent Application No. 2006-285564 filed on Oct. 19, 2006, the entire contents of which are incorporated herein by reference.

BACKGROUND OF THE INVENTION

1. Field of the Invention

The present invention relates to mobile terminals, gateways, remote control programs, access control programs, and data transfer systems for managing secure networks. More particularly, the present invention relates to mobile terminals, gateways, remote control programs, access control programs, and data transfer systems that transfer data from a secure network to another network according to commands given from outside of the secure network.

2. Description of the Related Art

Recent years have seen the emergence of mobile communication devices having multiple network interfaces, with the capability of downloading a large amount of data via the Internet or the like. For example, a new type of wireless Internet Protocol (IP) phones have radio interfaces for the Personal Handyphone System (PHS) and wireless local area network (LAN). The users of those devices tend to carry relatively large amounts of data (e.g., multimedia content) with them to enjoy music and video clips anywhere they go.

The memory capacity of existing mobile terminals is, however, not large enough to accommodate all data each user has. For this reason, most users keep their data files in a personal computer serving as a file server in their home or office, while carrying only a part of those data files in their mobile terminals.

When a user is away from home, he/she may feel it necessary to download some data from his/her home file server to the mobile terminal at hand. It would also be better if he/she could fetch the data in a quick and easy way. One proposed technique uses a two-dimensional barcode to enter the necessary information to his/her mobile terminal. See, for example, Japanese Patent Application Publication No. 2005-174317. According to this publication, a remote server produces an access identifier and delivers it to an information device. The information device displays the access identifier on a monitor screen in the form of a two-dimensional barcode. A local device can receive the access identifier by capturing the on-screen image of the barcode. The access identifier permits the local device to connect itself to the remote server and receive specified data from there. With this technique, the user can download desired data from the home file server to his/her local device while on the road.

However, from the viewpoint of network security, it is very risky to leave the home file server open to other anonymous network users. A typical method to control inbound access to a home file server is to place a gateway at the front end of the home network. The presence of such gateways, however, makes it difficult to use the remote access method disclosed in the Japanese Patent Application Publication No. 2005-174317 mentioned earlier, since the gateway is not transparent to the protocols used to transfer data between a remote server and a local device. In the case where the file server is protected by a gateway, some remote control mechanism to negotiate the gateway is required.

Mobile terminals with multiple wireless interfaces could serve as a gateway for small data files. For example, two people can exchange data files by using their mobile terminals as gateways interconnecting their respective file servers. In this case, the security of data transmission is ensured by using virtual private network (VPN) mechanisms to connect a mobile terminal to the user's home or office network. Mobile terminals, however, are limited in terms of processor performance and battery capacity. The use of such mobile terminals as gateways would impose a severe limitation on the service functionality and availability because of their power consumption and communication speeds.

One alternative method is to connect remote servers for data exchange purposes. Home networks and office networks usually have a firewall or a gateway (collectively referred to as "gateways") to guard their local devices against access from external networks. While port mapping functions of a gateway could solve the accessibility problem, this solution could introduce vulnerability to the system and increase the risk of information leakage and network attacks because the system cannot distinguish the sources of access.

SUMMARY OF THE INVENTION

In view of the foregoing, it is an object of the present invention to provide mobile terminals, gateways, remote control programs, access control programs, and data transfer systems that can control remotely a process of transferring data in a secure network to a device outside the secure network.

To accomplish the above object, the present invention provides a mobile terminal including the following elements: a communication controller, a connection request router, a first key router, a second key router, and a data download commander. The communication controller establishes a secure communication path to a gateway. The connection request router receives from another mobile terminal a connection request carrying a data identifier specifying desired data. The data identifier is saved in a memory space of the mobile terminal, and the connection request is forwarded to the gateway. The first key router forwards a first key from the gateway to the other mobile terminal, for use in access to the data corresponding to the data identifier. The second key router forwards a second key from the other mobile terminal to the gateway. The second key is produced originally by a device that will make access to the data corresponding to the data identifier. The data download commander retrieves the data identifier from the memory space and sends a data download command including the retrieved data identifier to the other mobile terminal, in response to a notice from the gateway indicating that the gateway has finished registration of the second key.

To accomplish the above object, the present invention also provides a gateway disposed between a security network and an external network to control access from the external network to the secure network. This gateway includes a communication controller, a key data memory, a first key issuer, a second key receiver, and a file request router. The communication controller establishes a secure communication path to reach a mobile terminal attached to the external network. The key data memory is for storing key data for use in access to a file server located within the secure network. In response to a connection request sent from the mobile terminal, the first key issuer produces and sends a first key to the mobile terminal, as well as saving the produced first key in the key data memory.

The second key receiver receives from the mobile terminal a second key that has been issued by a communication device on the external network. Upon receipt, the second key receiver saves the received second key in the key data memory in association with the first key and then sends a registration completion notice to the mobile terminal. The file request router forwards a file request containing two keys from the communication device to the file server if the first and second keys stored in the key data memory match with the two keys contained in the file request.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows an example data structure of device information.

FIG. 11 shows an example data structure of a data list.

FIG. 16 shows an example data structure of a connection request.

FIG. 17 shows an example data structure of a first access ticket.

FIG. 18 shows an example data structure of a ticket request.

FIG. 19 shows an example data structure of a ticket management table on the requesting party.

FIG. 20 shows an example data structure of a second access ticket.

FIG. 21 shows an example data structure of a ticket management table on the sending side.

FIG. 22 shows an example data structure of a data download command.

FIG. 25 shows an example data structure of a file request sent to a file server.

FIG. 33 shows an example data structure of a file request.

FIG. 34 shows an example data structure of a data upload command.

FIG. 37 shows an example data structure of a data download command.

FIG. 38 shows an example data structure of a data download command sent to the gateway.

DESCRIPTION OF THE PREFERRED EMBODIMENTS

Figure 1:
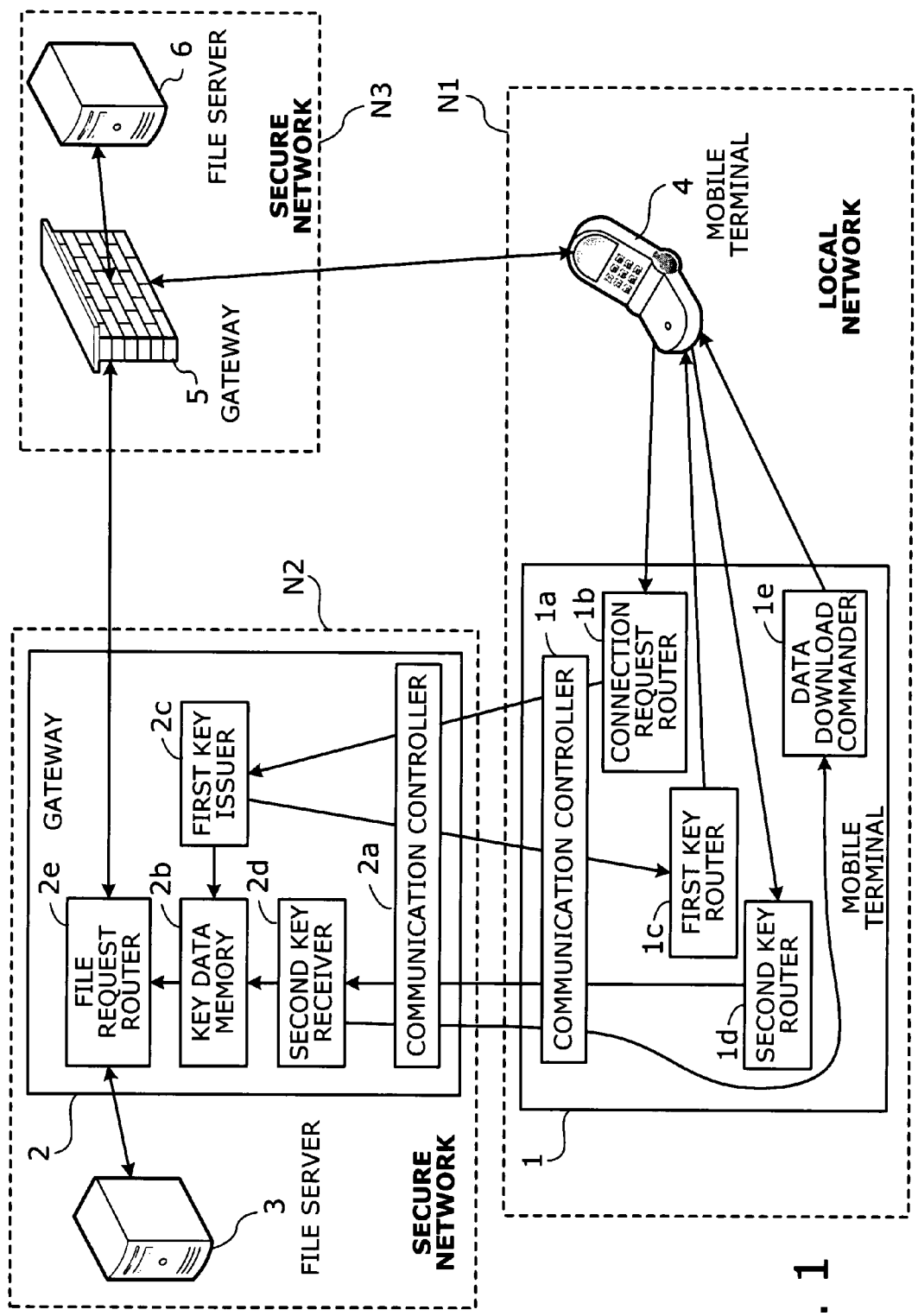
FIG. 1 gives an overview of the present invention.

Preferred embodiments of the present invention will be described below with reference to the accompanying drawings, wherein like reference numerals refer to like elements throughout.

FIG. 1 gives an overview of the present invention. Mobile terminals 1 and 4 are connected to a local network N1. A gateway 2 protects a secure network N2 accommodating a file server 3. Likewise, another gateway 5 protects a secure network N3 accommodating a file server 6. The mobile terminal 1 can communicate with the gateway 2 through a secure communication path. Also, the mobile terminal 4 can communicate with the gateway 5 through a secure communication path.

The mobile terminal 1 includes, among others, a communication controller 1a, a connection request router 1b, a first key router 1c, a second key router 1d, and a data download commander 1e. The following describes the functions of each element.

The communication controller 1a establishes a secure communication path to reach the gateway 2. For example, VPN mechanisms serve this purpose.

The connection request router 1b receives a connection request from another mobile terminal 4 on the network N1, which carries a data identifier (e.g., URL) specifying specific data (e.g., data available in the file server 3). Besides forwarding this connection request to the gateway 2, the connection request router 1b saves the data identifier in a memory space.

The first key router 1c receives a first key from the gateway 2 and forwards it to the mobile terminal 4. This first key is for use in access to the data corresponding to the data identifier.

The second key router 1d receives a second key from the mobile terminal 4 and forwards it to the gateway 2. This second key is produced by a communication device that will make access to the data corresponding to the data identifier. It is the gateway 5 in the system shown in FIG. 1.

The data download commander 1e receives from the gateway 2 a registration completion notice indicating that the gateway 2 has finished registration of the second key. Upon receipt, the data download commander 1e retrieves the stored data identifier out of the memory space and sends a data download command including the data identifier to the mobile terminal 4.

The gateway 2 includes, among others, a communication controller 2a, a key data memory 2b, a first key issuer 2c, a second key receiver 2d, and a file request router 2e. The following describes the functions of each element.

The communication controller 2a ensures a secure communication path to reach the mobile terminal 1. The key data memory 2b is a storage space for key data used to make access to the file server 3 within the secure network N2.

The first key issuer 2c produces a first key and saves it in the key data memory 2b in response to a connection request from the mobile terminal 1. The first key issuer 2c also sends the produced first key to the mobile terminal 1.

The second key receiver 2d receives the second key via the mobile terminal 1, which has originally been issued by some other communication device (gateway 5 in the present example) connected to the gateway 2 as described earlier. Upon receipt, the second key receiver 2d saves the second key in the key data memory 2b, in association with the first key. Afterwards, the second key receiver 2d sends a registration completion notice back to the mobile terminal 1.

The file request router 2e receives a file request from the communication device mentioned above (e.g., gateway 5). Upon receipt, the file request router 2e determines whether the key data memory 2b stores first and second keys that coincide with those contained in the received file request. If such a key data pair is found in the key data memory 2b, the file request router 2e forwards the file request to the file server 3. Upon receipt of the file request from the remote gateway 5, the file server 3 sends the specified data to the communication device that issued the file request.

The mobile terminal 4 is allowed to send a connection request to another mobile terminal 1. The mobile terminal 4 also forwards a first key from the mobile terminal 1 to the gateway 5, as well as a second key from the gateway 5 to the mobile terminal 1. In addition to that, the mobile terminal 4 forwards a data download command from the mobile terminal 1 to the gateway 5.

Upon receipt of the first key from the mobile terminal 4, the gateway 5 saves it in its memory space. The gateway 5 then produces a second key and sends it back to the mobile terminal 4. The gateway 5 is also responsive to a data download command. When such a command arrives, the gateway 5 sends a file request to the remote gateway 2 in an attempt to obtain the data specified by the received data download command. This file request contains both the first and second keys. Upon arrival of the requested data in response to the file request, the gateway 5 forwards the data to its local file server 6.

The above-described system operates as follows. First, the mobile terminal 1 and gateway 2 establishes a secure communication path by activating their respective communication controllers 1a and 2a. Afterwards the mobile terminal 4 sends a connection request to the mobile terminal 1. The connection request router 1b in the mobile terminal 1 forwards this request to the gateway 2, causing the first key issuer 2c in the gateway 2 to produce a first key. This first key is sent back to the mobile terminal 1, besides being saved locally in the key data memory 2b. The first key is then redirected to the mobile terminal 4 by the first key router 1c in the mobile terminal 1 and further transferred from the mobile terminal 4 to the gateway 5. The gateway 5 maintains the received first key locally.

Subsequently the gateway 5 produces a second key for delivery to the mobile terminal 4. The second key reaches the gateway 2 via the two mobile terminals 4 and 1. The gateway 2 saves this second key in association with the first key produced earlier. Upon saving the second key, the gateway 2 sends a registration completion notice to the mobile terminal 1. In response to this message, the mobile terminal 1 sends a data download command to the mobile terminal 4, which is then forwarded to the gateway 5.

The gateway 5 responds to the data download command by sending a file request containing the first key and second key to the gateway 2 over a broadband communication channel. The gateway 2 then determines whether the first and second keys in the received file request coincide with those stored in its key data memory 2b. If the two sets of key data match with each other, the gateway 2 forwards the file request to the file server 3. Upon receipt of this file request, the file server 3 sends the requested data back to the requesting device. The data goes to the gateway 2 and then reaches the gateway 5. The gateway 5 forwards the received data to the file server 6 on the secure network N3 to have it store that data.

As can be seen from the above, the present invention uses a secure communication path via mobile terminals to exchange control information such as keys between gateways 2 and 5, while using other path to transfer substantive data. Besides reducing the communication time of mobile terminals and saving the power consumption of same, the system according to the present invention transports important information safely. Also, according to the present invention, two devices exchange their keys. The use of two keys doubles the safety check, thus enhancing the security of communication. The following sections will give details of three embodiments of the present invention.

First Embodiment

Figure 2:
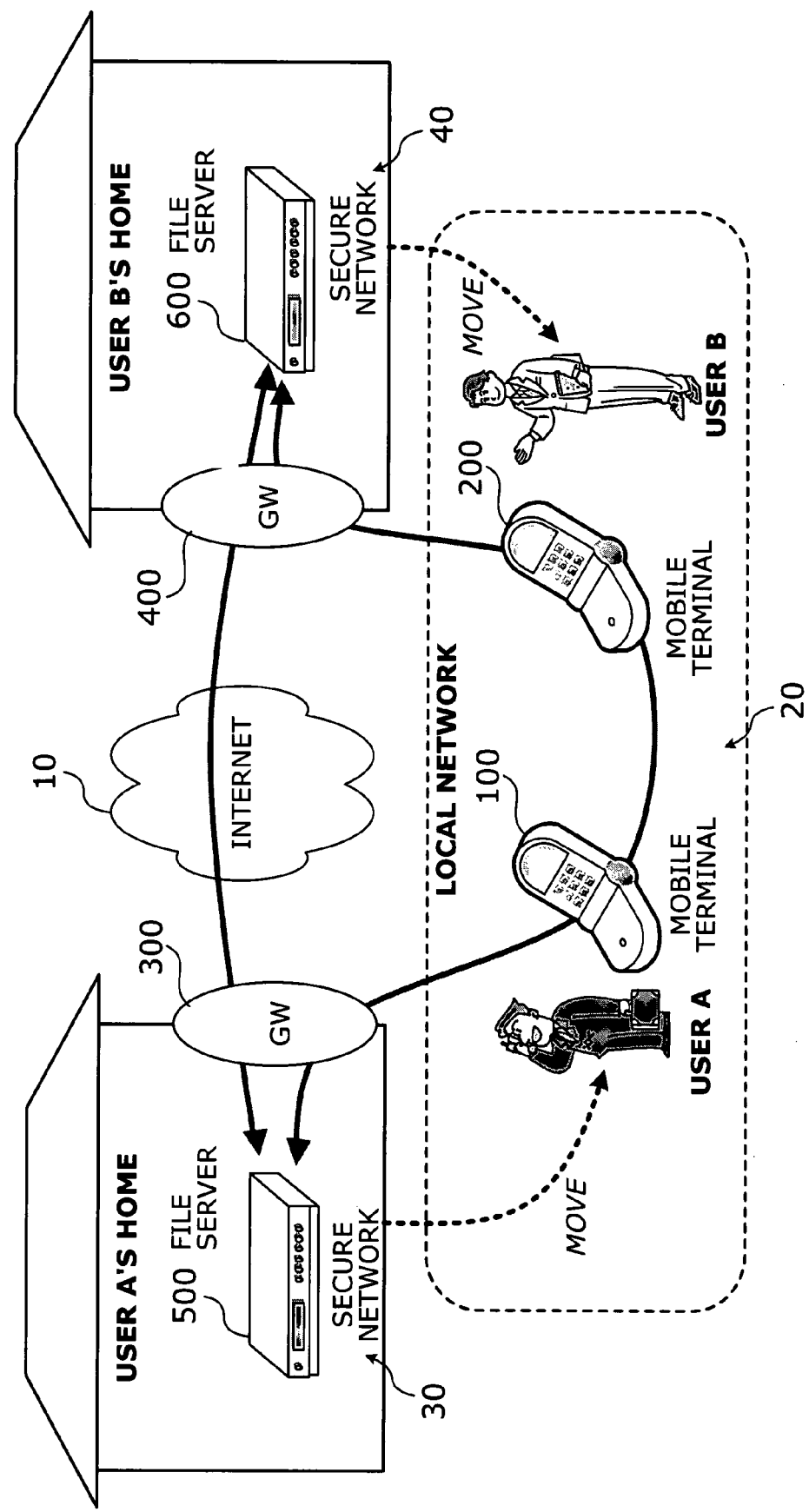
FIG. 2 shows an example system configuration according to a first embodiment of the present invention.

FIG. 2 shows an example system configuration according to a first embodiment of the present invention. This embodiment assumes that a secure network 30 in user A's home is connected to the Internet 10, as is a secure network 40 in user B's home.

User A's secure network 30 accommodates a file server 500 and is connected to the Internet 10 via a gateway (GW) 300. Likewise, user B's secure network 40 accommodates a file server 600 and is connected to the Internet 10 via a gateway 400. User A owns a mobile terminal 100, which includes a plurality of communication interfaces for wireless LAN, public telephone services (e.g., PHS, Third generation (3G) cellular network), and the like. The mobile terminal 100 can operate as a local device in the secure network 30 by connecting itself to the gateway 300 via a VPN mechanism. VPN connections, however, may not necessarily be essential to the communication with the gateway 300. The mobile terminal 100 has only to be able to communicate data in encrypted form after authenticating itself with the gateway 300.

Similarly to user A, user B has his/her own mobile terminal 200 with a plurality of communication interfaces for wireless LAN, public telephone services (e.g., PHS, 3G cellular network), and the like. The mobile terminal 200 can operate as a local device in the secure network 40 by connecting itself to the gateway 400 via a VPN mechanism. VPN connections, however, may not necessarily be essential to the communication with the gateway 400. The mobile terminal 200 has only to be able to communicate data in encrypted form after authenticating itself with the gateway 400.

The mobile terminals 100 and 200 may also form their local network 20, authenticating themselves by using ad-hoc connection over the wireless LAN. Ad-hoc connection is a communication mode in which network devices can communicate directly with each other without using access point services. This feature enables a highly reliable network path to be created from one file server 500 to another file server 600 via the two mobile terminals 100 and 200. Note that the Internet 10 offers another communication path between the two file servers 500 and 600, which does not involve the mobile terminals 100 and 200.

According to the present embodiment, user A and user B connect their mobile terminals 100 and 200 to a wireless LAN while on the go, thus forming their local network 20. The two users A and B operate their respective mobile terminals 100 and 200 to control data transfer from one file server 500 (accessible to the mobile terminal 100) to another file server 600 (accessible to the mobile terminal 200). This process begins with interactions between the gateways 300 and 400 to exchange connection data (e.g., Uniform Resource Locators (URLs) or IP addresses), as well as other information for the purpose of authentication and encryption, through the reliable communication path involving the mobile terminals 100 and 200. The file server 500 then transfer data to the file server 600 through the Internet 10. The gateways 300 and 400 uses the above information about connections, authentication, and encryption in this data transfer to ensure the security and reliability.

As can be seen from the above, the present embodiment uses a communication path involving mobile terminals 100 and 200 that are highly reliable but narrow in bandwidth for exchanging a small amount of information essential to the security and reliability, thus reducing power consumption and transmission time. The information obtained in this phase is used in the subsequent transfer of files containing substantive data over a broadband communication path. The proposed system thus achieves both ease and reliability in data transfer.

According to the first embodiment, the gateway 300 issues a first ticket containing some information that the file server 600 will be required to have when it attempts access to the remote file server 500 to transfer data. The gateway 300 provides this information to the remote secure network 40 through the reliable communication path involving mobile terminals 100 and 200. Likewise, the gateway 400 issues a second ticket containing some information that the file server 500 will be required to have when it attempts access to the remote file server 600 to transfer data.

The file server 600 attaches the first and second tickets to a file request addressed to the file server 500. The receiving file server 500 accepts the file request and starts sending data only when the first ticket matches with the one issued in the secure network 30 and the requesting party coincides with the issuer of the second ticket. That is, the present embodiment enables securer and more reliable data transfer by requiring both parties to exchange tickets and confirm the identity of tickets and that of the requesting party.

Figure 3:
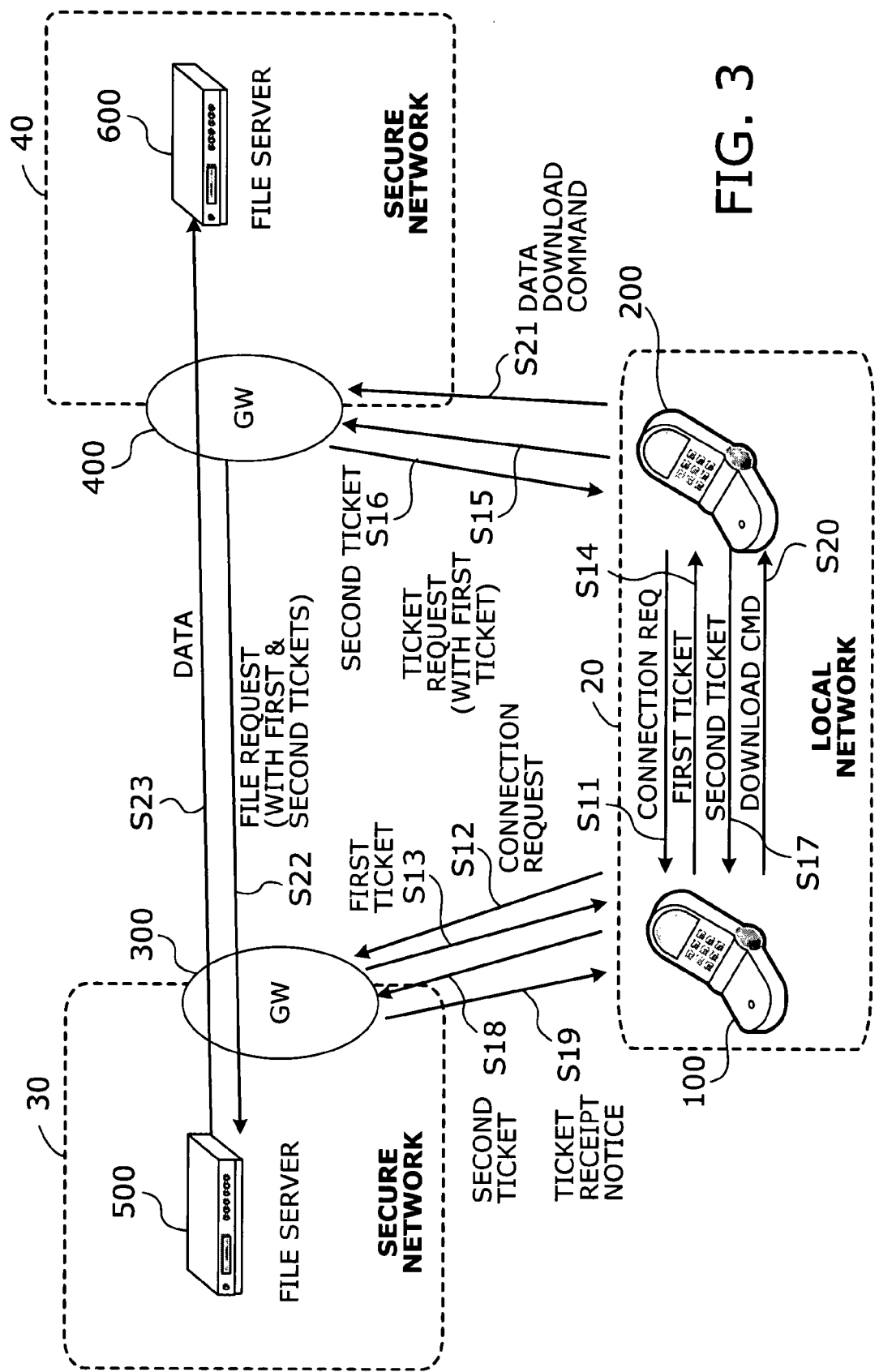
FIG. 3 gives an overview of how data is transferred according to the first embodiment.

FIG. 3 gives an overview of how data is transferred according to the first embodiment. First, the requesting mobile terminal 200 sends out a connection request to the mobile terminal 100 (step S11). Upon receipt of the request, the mobile terminal 100 forwards it to the gateway 300 (step S12). The gateway 300 responds to the connection request by issuing a first ticket. The issued first ticket is sent back to the mobile terminal 100 (step S13). The mobile terminal 100 forwards it to the mobile terminal 200 (step S14).

The mobile terminal 200 then sends a ticket request, together with the first ticket, to the gateway 400 (step S15). The gateway 400 responds to the ticket request by issuing a second ticket. This second ticket is sent to the mobile terminal 200 (step S16). The mobile terminal 200 forwards the second ticket to the mobile terminal 100 (step S17), and the mobile terminal 100 forwards it further to the gateway 300 (step S18).

Upon receipt of the second ticket, the gateway 300 returns a ticket receipt notice to the mobile terminal 100 (step S19). The mobile terminal 100 responds to this ticket receipt notice by issuing a data download command to the mobile terminal 200 (step S20). Then the mobile terminal 200 issues a data download command to the gateway 400 (step S21), thus causing the gateway 400 to output a file request addressed to the file server 500 (step S22), together with the first ticket and second ticket.

The gateway 300 examines the first and second ticket attached to the file request. If they match with those issued earlier, then the gateway 300 permits that file request to go through to the file server 500. In response to the file request, the file server 500 provides the requested data to the file server 600 (step S23).

Hardware Platforms

Each device has various hardware components to implement the process shown in FIG. 3. The specifics of those components will now be described below.

Figure 4:
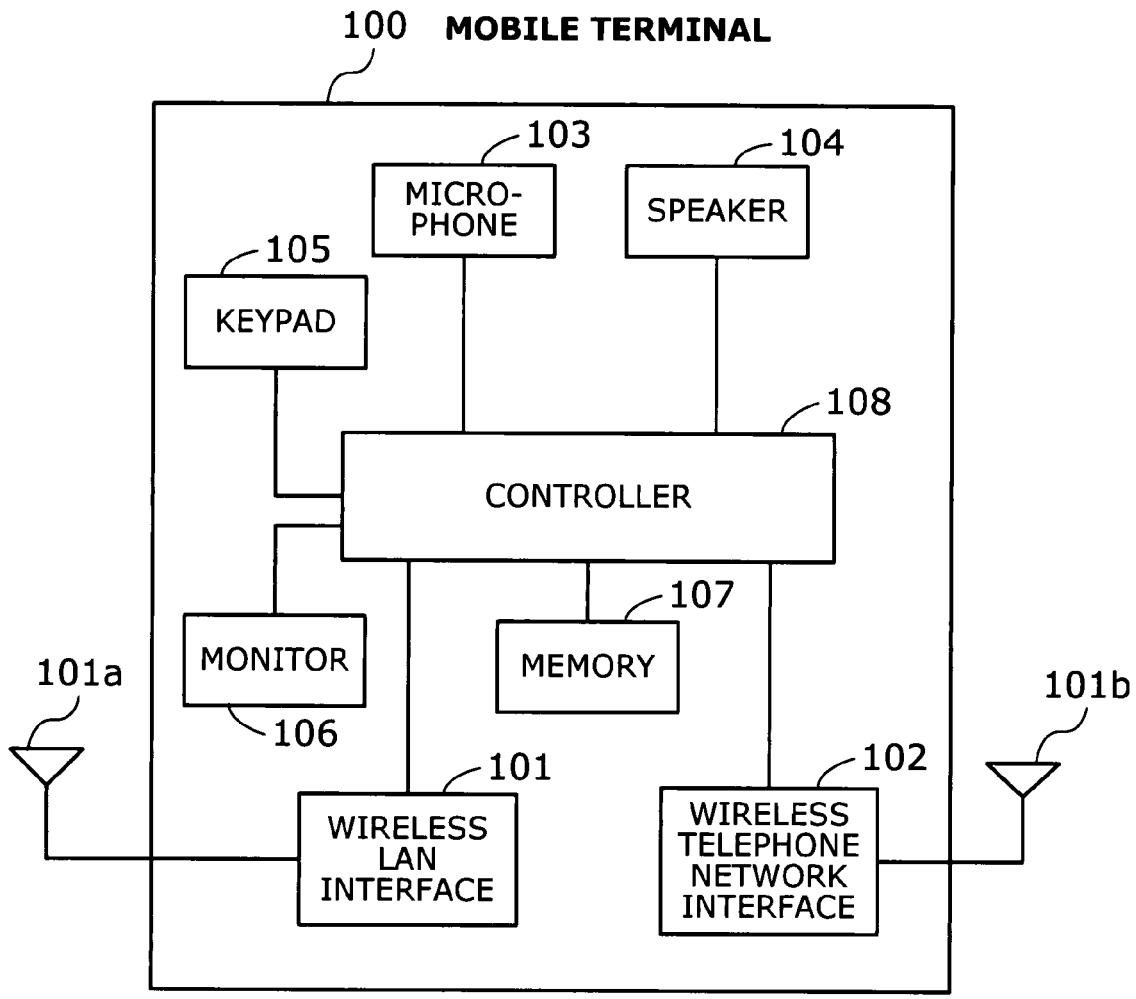
FIG. 4 shows an example hardware configuration of a mobile terminal.

FIG. 4 shows an example hardware configuration of the mobile terminal 100. The entire system of the mobile terminal 100 is controlled by a controller 108. Connected to this controller 108 are a wireless LAN interface 101, a wireless telephone network interface 102, a microphone 103, a speaker 104, a keypad 105, a monitor 106, and a memory 107.

The wireless LAN interface 101 communicates with a wireless LAN access point via an antenna 101a to send and receive data signals by radio. Likewise, the wireless telephone network interface 102 communicates with a base station of a mobile phone network via another antenna 101b to send and receive data signals by radio.

The microphone 103 takes in voice of the user and passes the voice signal to the controller 108. The speaker 104 produces voice and sound according to voice and sound data supplied from the controller 108. The keypad 105 is composed of a plurality of key buttons including numeric keys. When the user presses a key, the keypad 105 sends a corresponding signal to the controller 108. The monitor 106 is, for example, a liquid crystal display device, which is used to display images sent from the controller 108. The memory 107 stores programs describing what the controller 108 is supposed to process, together with data for that processing. While FIG. 4 illustrates one mobile terminal 100, the same hardware structure may also be applied to the other mobile terminal 200.

Figure 5:
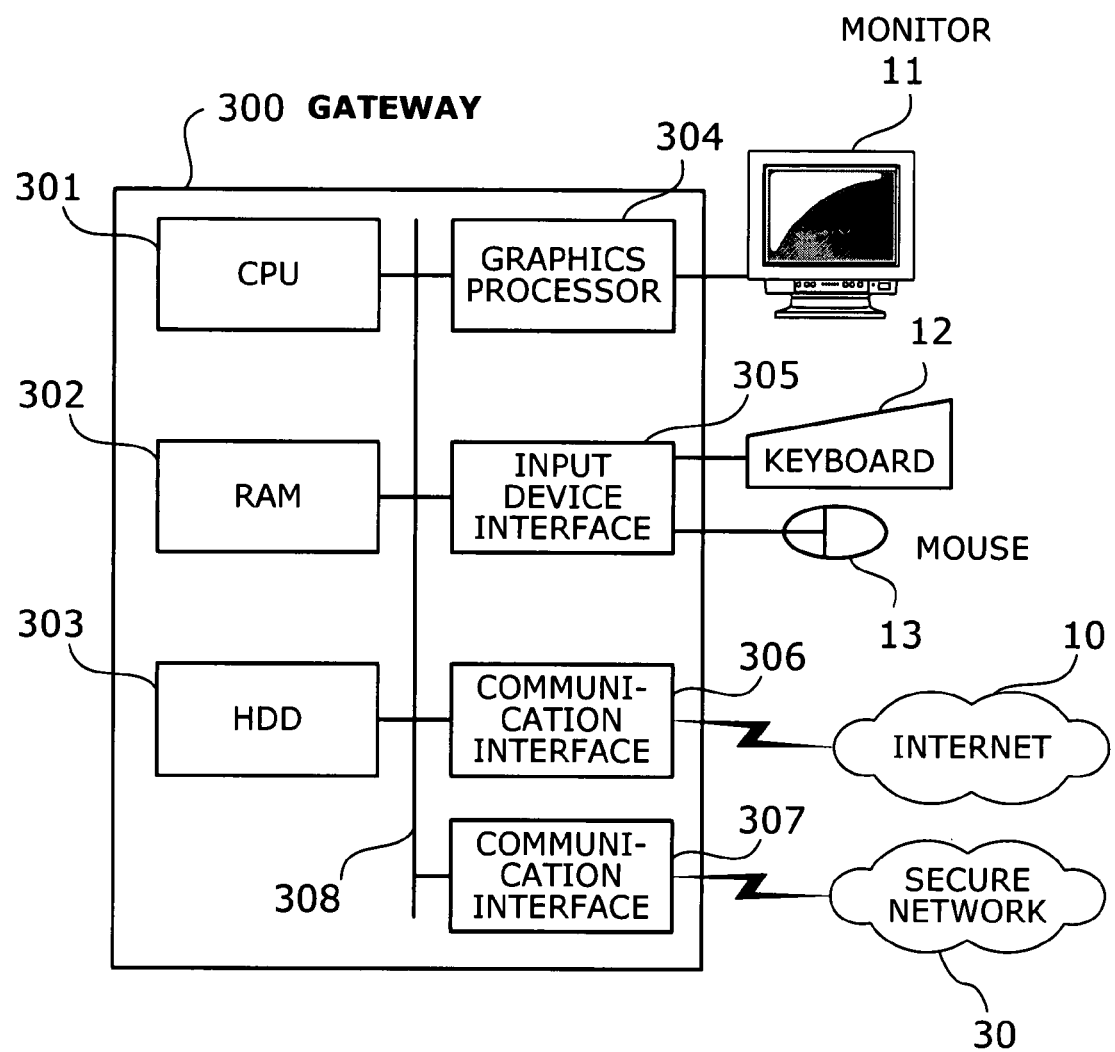
FIG. 5 shows an example hardware configuration of a gateway used in the present embodiment.

FIG. 5 shows an example hardware configuration of gateways used in the present embodiment. The illustrated gateway 300 has the following elements: a central processing unit (CPU) 301, a random access memory (RAM) 302, a hard disk drive (HDD) 303, a graphics processor 304, an input device interface 305, and two communication interfaces 306 and 307. The CPU 301 controls the entire computer system, interacting with other elements via a bus 308.

The RAM 302 serves as temporary storage for the whole or part of operating system (OS) programs and application programs that the CPU 301 executes, in addition to other various data objects to be manipulated at runtime. The HDD 303 stores program and data files of the operating system and various applications.

The graphics processor 304 produces video images in accordance with drawing commands from the CPU 301 and displays them on the screen of a monitor 11 coupled thereto.

The input device interface 305 is used to receive signals from external input devices, such as a keyboard 12 and a mouse 13. Those input signals are supplied to the CPU 301 via the bus 308.

One communication interface 306 is connected to the Internet 10 to send and receive data to/from the mobile terminal 100 and gateway 400. Another communication interface 307 is connected to the secure network 30 to exchange data with the file server 500.

The hardware platform described above can be used to realize the processing functions of the present embodiment. While FIG. 5 shows the gateway 300, the same hardware platform can also be applied to other devices including the gateway 400 and file servers 500 and 600, except that the file servers 500 and 600 need only one communication interface.

Elements of First Embodiment

Figure 6:
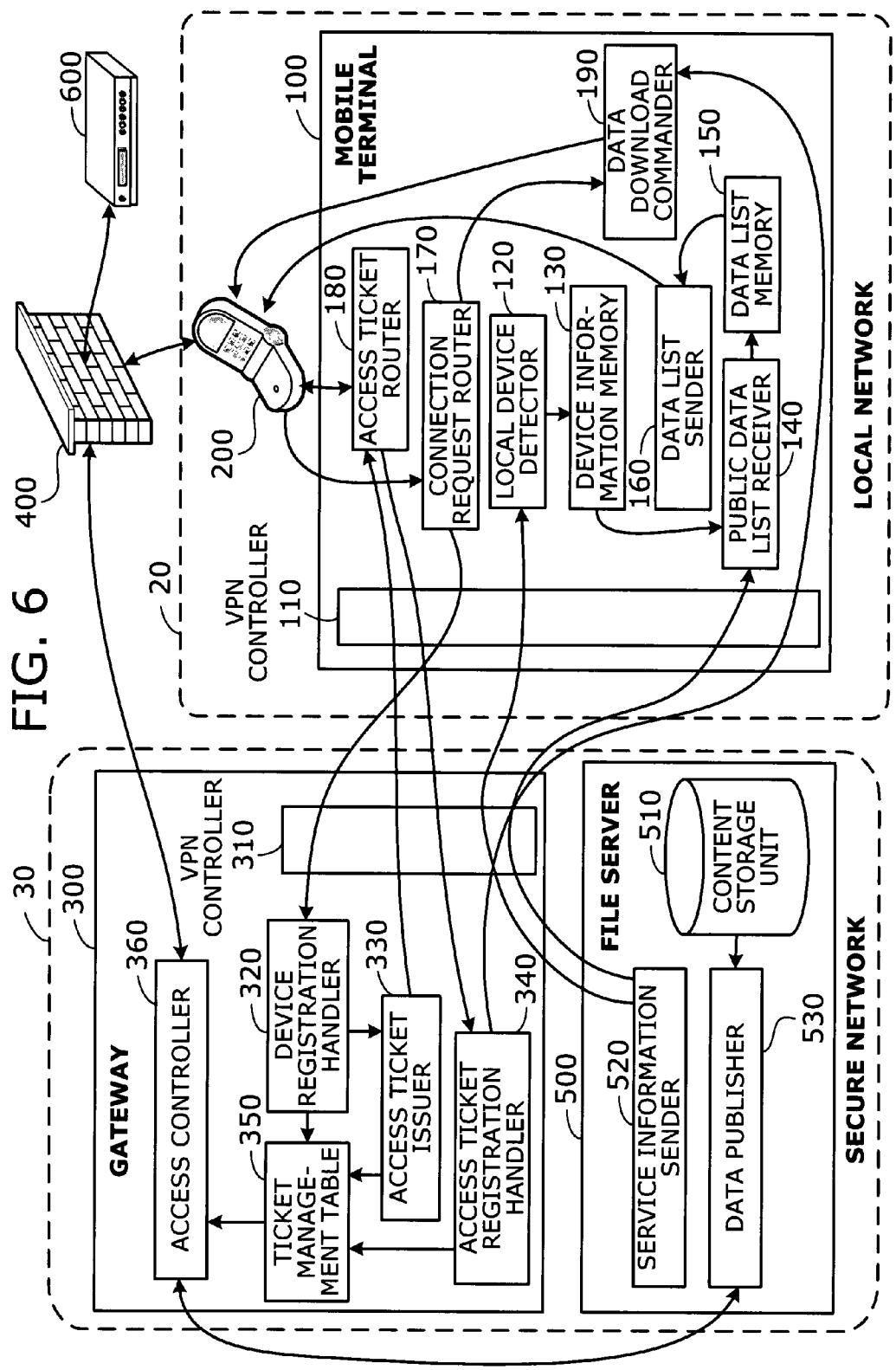
FIG. 6 is a functional block diagram of devices that user A owns.

The present embodiment is implemented as a collection of various functional elements described below. FIG. 6 is a functional block diagram of devices that user A owns. The mobile terminal 100 includes, among others, a VPN controller 110, a local device detector 120, a device information memory 130, a public data list receiver 140, a data list memory 150, a data list sender 160, a connection request router 170, an access ticket router 180, and a data download commander 190. The following describes the functions of each element.

The VPN controller 110 is connected to the gateway 300 of the secure network 30 by using VPN functions. When communicating with the gateway 300, the VPN controller 110 encrypts packets. Specifically, the VPN controller 110 adds some new header information to encrypted data before they are transmitted to the gateway 300 over the Internet 10. The VPN controller 110 also decrypts data in each incoming packet received from the gateway 300. The decrypted data includes header information in plaintext form, based on which the VPN controller 110 delivers the decrypted data to appropriate elements.

The local device detector 120 detects other devices on the secure network 30 after the VPN controller 110 attaches the mobile terminal 100 to the secure network 30. Specifically, the local device detector 120 broadcasts a device information request over the secure network 30 according to prescribed protocols. Devices using a protocol responsive to the device information request return their device information back to the local device detector 120. The local device detector 120 stores the returned device information in the device information memory 130. The device information memory 130 is a storage space for device information. Specifically, a part of the memory 107 (FIG. 4) is allocated for this purpose.

After the mobile terminal 100 is attached to the secure network 30 through a VPN connection, the public data list receiver 140 looks into the device information in the device information memory 130, thus recognizing the presence of a file server 500 within the secure network 30. The public data list receiver 140 then makes access to the file server 500 to obtain a list of data being available to public and saves the obtained data list in the data list memory 150.

The data list memory 150 is a storage space for data lists. Specifically, a part of the memory 107 (FIG. 4) is allocated for this purpose. The data list sender 160 retrieves a data list from the data list memory 150 and provides it to the mobile terminal 200 via the local network 20.

The connection request router 170 forwards a connection request from the mobile terminal 200 to the gateway 400. The connection request contains an identifier (e.g., URL) of desired data. The connection request router 170 extracts this data identifier out of the connection request and passes it to the data download commander 190.

The access ticket router 180 forwards a first access ticket from the gateway 400 to the mobile terminal 200. Also, the access ticket router 180 forwards a second access ticket from the mobile terminal 200 to the gateway 400.

The data download commander 190 sends a data download command to the mobile terminal 200 when a second ticket receipt notice is received from the gateway 300. This data request is supposed to contain a specific data identifier. The connection request router 170 provides the one to the data download commander 190 as described earlier. The data download commander 190 has kept that data identifier in some memory space since and includes it in the data request before it is sent out to the mobile terminal 200.

The gateway 300 includes, among others, a VPN controller 310, a device registration handler 320, an access ticket issuer 330, an access ticket registration handler 340, a ticket management table 350, and an access controller 360. The following describes the functions of each element.

The VPN controller 310 establishes a VPN connection with the mobile terminal 100 over the Internet 10. To achieve this, the VPN controller 310 authenticates the mobile terminal 100, thus finding that user A is the owner of the mobile terminal 100. The authentication is based on, for example, matching a previously registered ID of the mobile terminal 100 with an ID actually received from the mobile terminal 100 during the course of establishing a VPN connection. Another function of the VPN controller 310 is to encrypt outgoing packets and add header information for the Internet transport when sending data to the VPN-connected mobile terminal 100. Yet another function of the VPN controller 310 is to decrypt data contained in incoming packets from the mobile terminal 100. The VPN controller 310 handles the data (e.g., direct the data to appropriate destinations) according to header information included in the decrypted data.

The device registration handler 320 receives a connection request from the mobile terminal 100. The received connection request contains a specific device ID. The device registration handler 320 registers this device ID as an entry of the ticket management table 350. The device registration handler 320 also asks the access ticket issuer 330 to issue an access ticket in response to the connection request.

The access ticket issuer 330 issues a first access ticket upon request from the device registration handler 320. The access ticket issuer 330 sends this first access ticket back to the mobile terminal 100, as well as registering it with the ticket management table 350.

The ticket management table 350 is a memory space for storing first and second access tickets together with their corresponding device IDs. Specifically, a part of the RAM 302 (FIG. 5) is allocated for this purpose.

The access controller 360 compares the first and second access tickets contained in a file request received from the gateway 400 with the corresponding information stored in the ticket management table 350. If the ticket management table 350 has an entry that matches with the received first and second tickets, and if some requirements (e.g., expiration dates of the tickets) are met, the access controller 360 forwards the file request to the file server 500.

The file server 500 includes, among others, a content storage unit 510, a service information sender 520, and a data publisher 530. The following describes the functions of each element.

The content storage unit 510 is a storage space for data to be made open to the public. Specifically, a part of a hard disk drive in the file server 500 may be allocated to this purpose.

The service information sender 520 outputs device information of the file server 500a in response to a device information request. This device information includes, for example, a unique identifier of the file server 500 and a piece of information describing what functions the file server 500 offers.

The data publisher 530 is responsive to file requests arriving from the gateway 300. Specifically, the data publisher 530 retrieves requested data from the content storage unit 510 and sends it back to the requesting party via the gateway 300.

Figure 7:
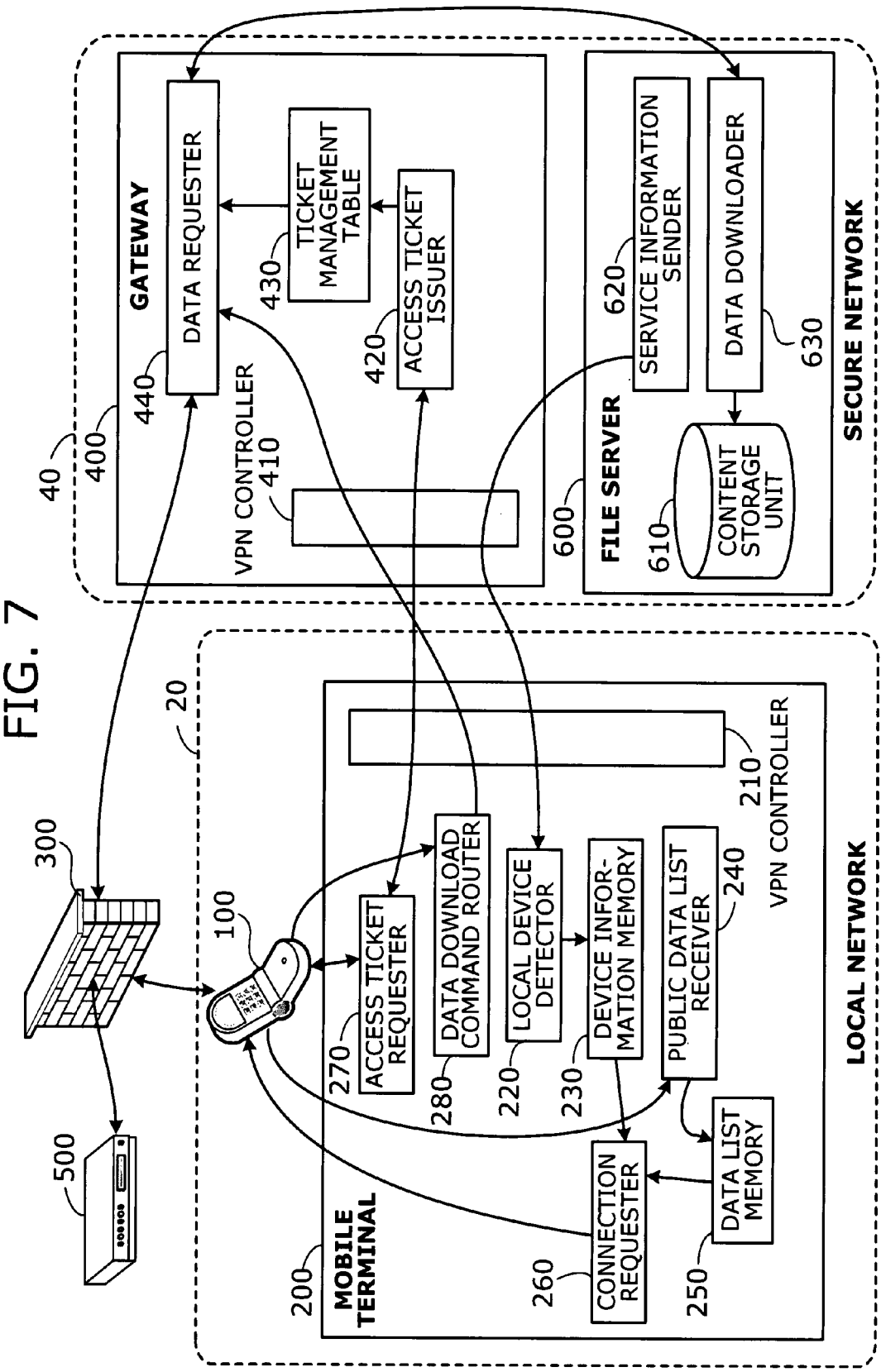
FIG. 7 is a functional block diagram of devices that user B owns.

FIG. 7 is a functional block diagram of devices that user B owns. The mobile terminal 200 includes, among others, a VPN controller 210, a local device detector 220, a device information memory 230, a public data list receiver 240, a data list memory 250, a connection requester 260, an access ticket requester 270, and a data download command router 280. The following describes the functions of each element.

The VPN controller 210 communicates with the gateway 400 of the secure network 40 by using VPN functions as well as encrypting and decrypting packets. Specifically, the VPN controller 210 adds some new header information to encrypted data before it is transmitted to the gateway 400 over the Internet 10. The VPN controller 210 decrypts data in each incoming packet received from the gateway 400. The decrypted data includes header information in plaintext form, based on which the VPN controller 210 delivers the decrypted data to appropriate functional elements.

The local device detector 220 detects other devices on the secure network 40 after the VPN controller 210 attaches the mobile terminal 200 to the secure network 40. Specifically, the local device detector 220 broadcasts a device information request over the secure network 40 according to prescribed protocols. Devices using a protocol responsive to the device information request return their device information back to the local device detector 220. The local device detector 220 then stores the returned device information in the device information memory 230.

The device information memory 230 is a storage space for device information. Specifically, a part of a memory device is allocated for this purpose.

The public data list receiver 240 communicates with the mobile terminal 100 to obtain a list of data that the file server 500 makes public. The public data list receiver 240 stores the obtained data list in the data list memory 250.

The data list memory 250 is a storage space for data lists. Specifically, a part of a memory device is allocated for this purpose.

The connection requester 260 selects specific data from among those registered in the data list memory 250 according to a user input. The connection requester 260 also selects device data of a destination device from among those stored in the device information memory 230 according to another user input. Then the connection requester 260 sends a connection request to the mobile terminal 100 over the local network 20 to request a connection in an attempt to transfer the selected data to the selected destination device (e.g., file server 600 in the context of the present embodiment).

The access ticket requester 270 receives a first ticket from the mobile terminal 100. Upon receipt, the access ticket requester 270 sends a ticket request, together with the received first ticket, to the gateway 400. This ticket request causes the gateway 400 to return a second access ticket. The access ticket requester 270 receives and forwards the second access ticket to the mobile terminal 100.

The gateway 400 includes, among others, a VPN controller 410, an access ticket issuer 420, a ticket management table 430, and a data requester 440. The following describes the functions of each element.

The VPN controller 410 establishes a VPN connection with the mobile terminal 200 over the Internet 10. To achieve this, the VPN controller 410 authenticates the mobile terminal 200, thus finding that user B is the owner of the mobile terminal 200. The authentication is based on, for example, matching a previously registered ID of the mobile terminal 200 with an ID actually received from the mobile terminal 200 during the course of establishing a VPN connection. Another function of the VPN controller 410 is to encrypt outgoing packets and add header information for the Internet transport when sending data to the VPN-connected mobile terminal 200. Yet another function of the VPN controller 410 is to decrypt data contained in incoming packets received from the mobile terminal 200. The VPN controller 410 handles the data (e.g., direct the data to appropriate destinations) according to header information included in the decrypted data.

The access ticket issuer 420 receives a ticket request from the mobile terminal 200, together with a specific device ID and first access ticket. The access ticket issuer 420 saves the received device ID and first access ticket in the ticket management table 430 and then issues a second access ticket to the mobile terminal 200, as well as registering it with the ticket management table 430. The ticket management table 430 is a memory space for storing first and second access tickets together with their corresponding device IDs. Specifically, a part of RAM is allocated for this purpose.

The data requester 440 receives from the mobile terminal 200 a data download command for a specific file. Upon receipt, the data requester 440 sends a file request to the gateway 300 over the Internet 10 in an attempt to obtain the requested file. To achieve this, the data requester 440 consults the ticket management table 430 to find relevant first and second access tickets. The data requester 440 includes those access tickets and the device ID of the file server 600 in the file request before transmitting it.

The file server 600 includes, among others, a content storage unit 610, a service information sender 620, and a data downloader 630. The following describes the functions of each element.

The content storage unit 610 is a storage space for received data. Specifically, a part of a hard disk drive in the file server 600 may be allocated to this purpose. The service information sender 620 outputs device information of the file server 600 in response to a device information request. This device information includes, for example, a unique identifier of the file server 600 and a piece of information describing what functions the file server 600 offers. The data downloader 630 receives data files via the gateway 400 and saves it in the content storage unit 610.

Data Transfer in First Embodiment

Figure 8:
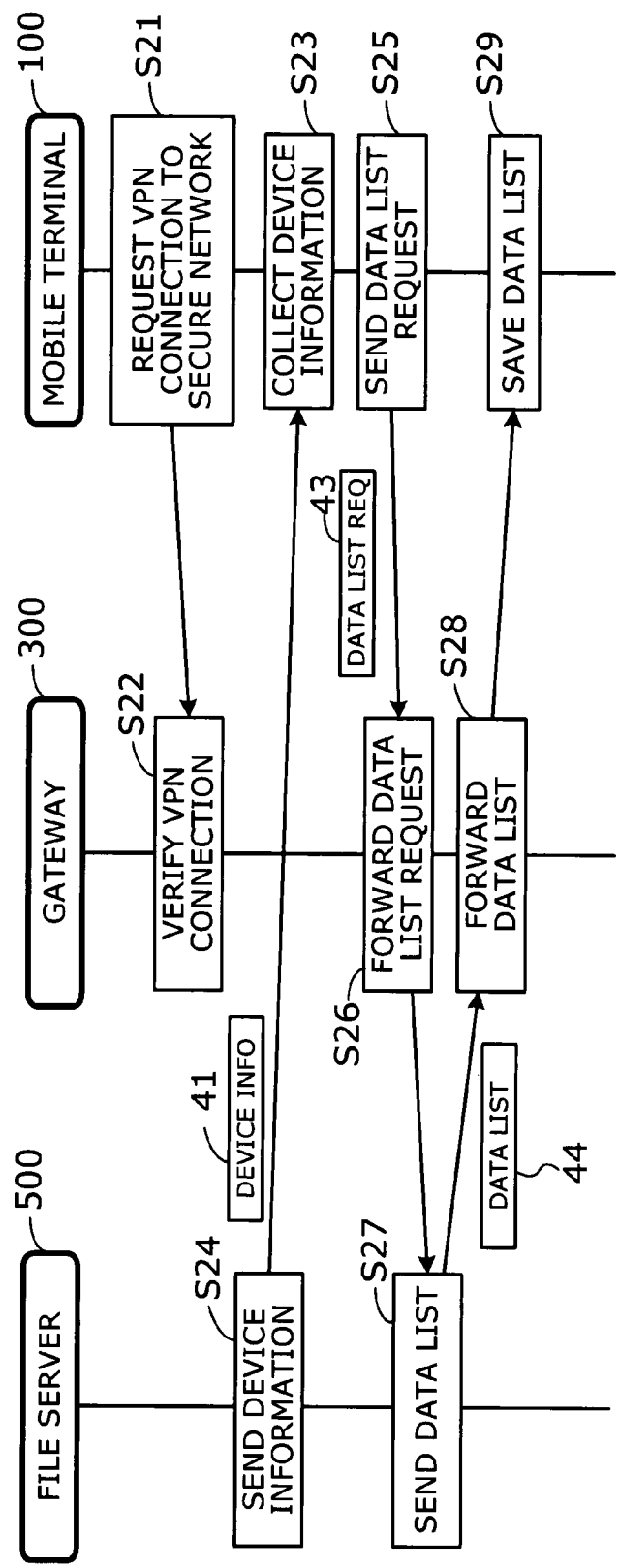
FIG. 8 is a sequence diagram showing how a data transfer session is prepared on user A's part according to the first embodiment.

The above-described functional elements enables specified data that user A maintains in his/her file server 500 to be transferred to the remote file server 600 at user B's home. This section gives the details of this process. FIG. 8 is a sequence diagram showing how a data transfer session is prepared on user A's part according to the first embodiment. This preparatory process includes the following steps:

(Step S21) User A visits a hot spot (i.e., an area where wireless LAN service is available for public) and uses its wireless LAN service to attach his/her mobile terminal 100 to a local network 20. According to user A's commands, the VPN controller 110 in the mobile terminal 100 makes access to the gateway 300 in the secure network 30 so as to send a VPN connection request. Here, the mobile terminal 100 uses the Internet 10 as a physical path to reach the gateway 300.

(Step S22) The VPN controller 310 in the gateway 300 sets up a VPN communication environment and verifies the VPN connection in response to the VPN connection request from the mobile terminal 100, thus permitting the mobile terminal 100 to act as a local device in the secure network 30. This means that the mobile terminal 100 can now communicate on both the local network 20 and secure network 30.

(Step S23) The mobile terminal 100 collects device information from other devices on the secure network 30. Specifically, the local device detector 120 in the mobile terminal 100 broadcasts a device information request over the secure network 30.

(Step S24) The service information sender 520 in the file server 500 sends its device information 41 back to the requesting mobile terminal 100.

FIG. 9 shows an example data structure of device information. The illustrated device information 41 is formed from the following parameters: "DEVICE NAME," "DEVICE TYPE," "MANUFACTURER," "ID," and "ACCESS URL." The DEVICE NAME parameter indicates which device is sending this device information 41. The DEVICE TYPE parameter shows what functions the sending device has. In the example of FIG. 9, the DEVICE TYPE parameter has a value of "FILE SERVER," which means the sending device has the function of providing files over the network. The MANUFACTURER parameter gives the name of a manufacturer that produced the sending device. The ID parameter is an identifier that uniquely distinguishes the sending device from others. The ACCESS URL parameter gives a uniform resource locator of a specific file that calls up the function indicated by the DEVICE TYPE parameter. Such device information 41 of the file server 500 is saved in the device information memory 130.

Referring back to FIG. 8, the following step will be executed after the device information 41 is provided at step S24.

(Step S25) The public data list receiver 140 in the mobile terminal 100 sends a data list request 43 to the file server 500.

Figure 10:
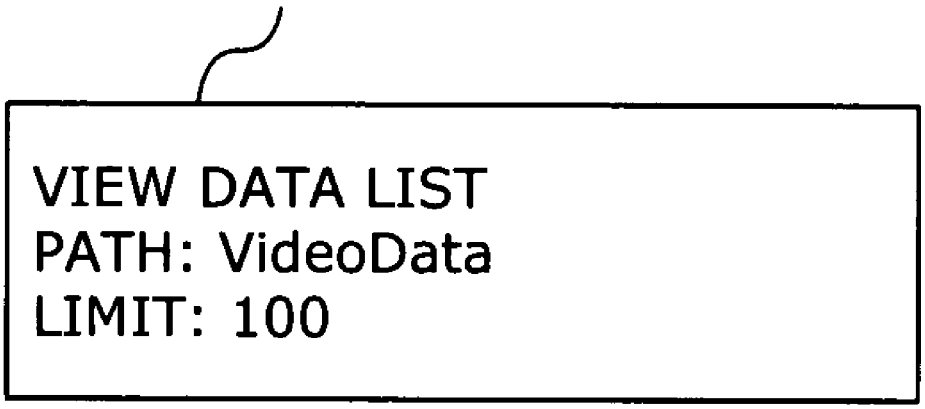
FIG. 10 shows an example data structure of a data list request.

FIG. 10 shows an example data structure of this data list request 43. The data list request 43 begins with a line indicating that it is requesting a data list for viewing purposes. The data list request 43 also contains a folder path parameter ("PATH") and upper limit parameter ("LIMIT") for use in executing the command. The PATH parameter uniquely specifies a folder where the desired data is stored. The value of PATH is previously defined and stored in a memory area that the public data list receiver 140 manages. Alternatively, the PATH parameter value may be specified by the user when the data list request 43 is issued. The LIMIT parameter specifies the number of data names that a single list is allowed to contain. The value of this LIMIT parameter is previously defined and stored in a memory area that the public data list receiver 140 manages, or alternatively, it may be specified by the user when the data list request 43 is issued.

More specifically, the PATH parameter shown in FIG. 10 indicates a relative path with respect to a predetermined reference folder, assuming that a data list file is created previously and stored in the file server 500. Alternatively, the data list request 43 may specify an absolute path of the folder (e.g., http://homegw.ddns.xyz/mediaserver/contents/) instead of a relative path.

Referring back to FIG. 8, the following steps will be executed after the data list request 43 is sent out at step S25.

(Step S26) The gateway 300 forwards the data list request 43 to the file server 500.

(Step S27) Upon receipt of the data list request 43, the file server 500 goes to the folder specified by its PATH parameter to retrieve and send a data list 44 to the gateway 300. This data list 44 contains at most as many data names as specified by the LIMIT parameter of the data list request 43.

(Step S28) The gateway 300 forwards the received data list 44 to the mobile terminal 100.

FIG. 11 shows an example data structure of this data list 44. The data list 44 begins with a line indicating that it is a response to a data list request that has been issued for viewing purposes. The data list 44 also has a parameter named "LIST ENTRY," which indicates how many entries are included in the data list 44. The data list then enumerates as many data names as indicated by the LIST ENTRY parameter. Each data name is accompanied by a URL to be used for access to the corresponding data. A folder name can also be a list entry.

Referring back to FIG. 8, the following step will be executed after the data list 44 is provided at step S28.

(Step S29) The public data list receiver 140 in the mobile terminal 100 saves the received data list 44 in the data list memory 150.

With the above-described steps S21 to S29, the mobile terminal 100 of user A is now ready for data transfer.

Figure 12:
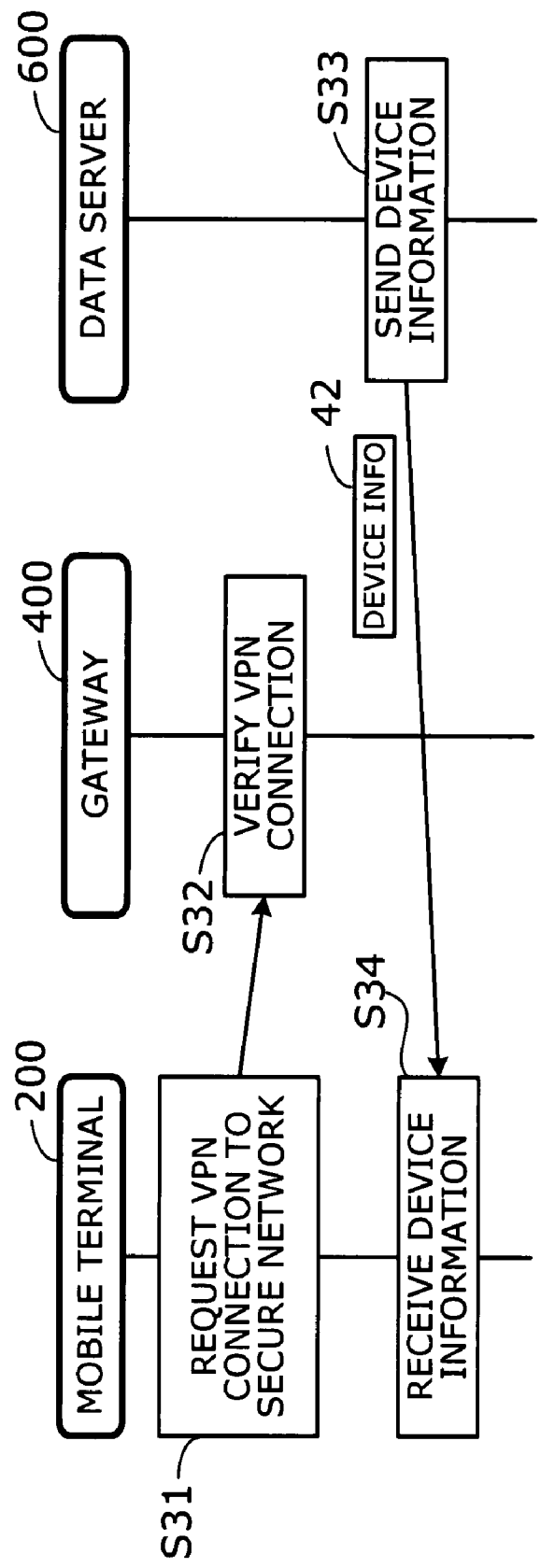
FIG. 12 is a sequence diagram showing how a data transfer session is prepared on user B's part according to the first embodiment.

FIG. 12 is a sequence diagram showing how a data transfer session is prepared on user B's part according to the first embodiment. This preparatory process includes the following steps:

(Step S31) User B visits the hot spot where user A has been staying and connects his/her mobile terminal 200 to the local network 20 using wireless LAN functions. According to user B's commands, the VPN controller 210 in the mobile terminal 200 makes access to the gateway 400 of the secure network 40 so as to send a VPN connection request. Here, the mobile terminal 200 uses the Internet 10 to reach the gateway 400.

(Step S32) The VPN controller 410 in the gateway 400 sets up a VPN communication environment and verifies the VPN connection in response to the VPN connection request from the mobile terminal 200, thus permitting the mobile terminal 200 to act as a local device on the secure network 40. This means that the mobile terminal 200 can now communicate over both the local network 20 and secure network 40.

(Step S33) The mobile terminal 200 collects device information from other devices on the secure network 40. Specifically, the local device detector 220 in the mobile terminal 200 broadcasts a device information request over the secure network 40.

(Step S34) The service information sender 620 in the file server 600 sends its device information 42 back to the requesting mobile terminal 200.

The above steps S31 to S34 make the mobile terminal 200 of user A ready for data transfer. The two mobile terminals 100 and 200 then communicate with each other over the local network 20 to select which data to transfer and then initiate a data transfer session.

Figure 13:
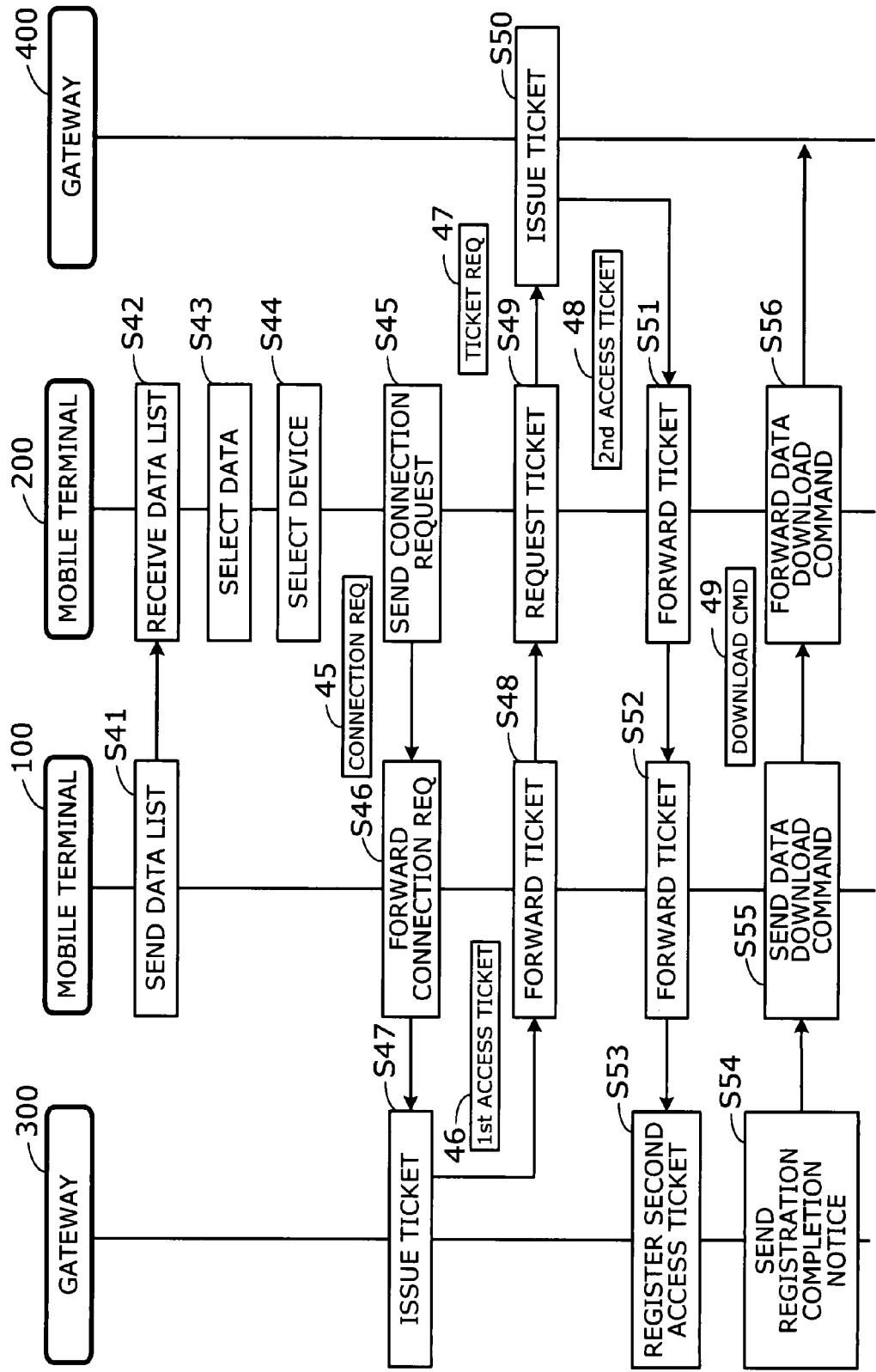
FIG. 13 is a sequence diagram showing a process until a data download command is issued.

FIG. 13 is a sequence diagram showing a process until a data download command is issued. This process includes the following steps:

(Step S41) The data list sender 160 in the mobile terminal 100 retrieves the data list 44 from the data list memory 150 and sends it to the mobile terminal 200.

(Step S42) The public data list receiver 240 in the mobile terminal 200 receives the data list 44 from the mobile terminal 100 and saves it in the data list memory 250.

(Step S43) The connection requester 260 consults the data list 44 stored in the data list memory 250 to select which data to request. Specifically, the connection requester 260 outputs the data list 44 on a monitor screen of the mobile terminal 200 and prompts user B to choose his/her desired data. User B specifies data, thus allowing the connection requester 260 to determine which data to request.

Figure 14:
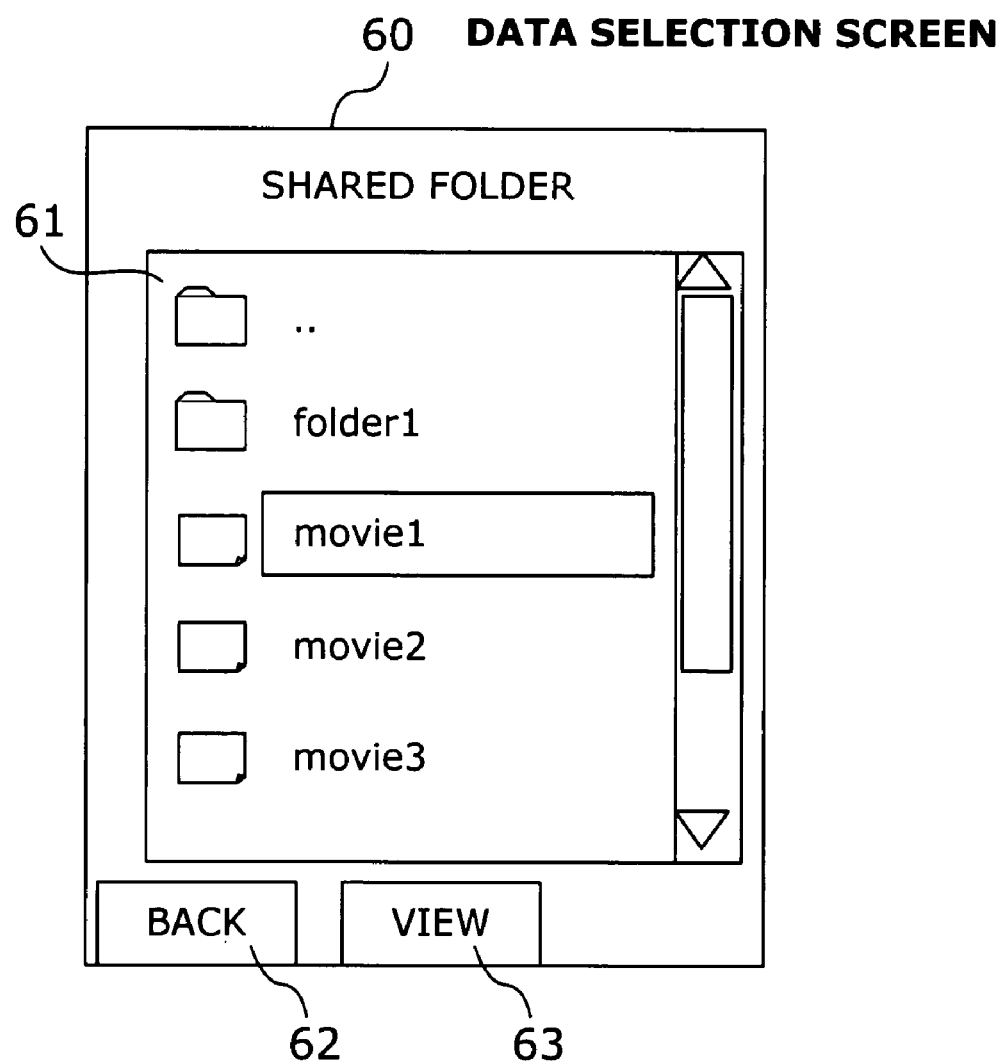
FIG. 14 shows an example of a data selection screen.

FIG. 14 shows an example of a data selection screen. This data selection screen 60 has a list display field 61. The names of folders and data contained in the data list 44 appear on the list display field 61, enabling the user to specify a desired data file by selecting its name using the keypad of the mobile terminal 200.

Placed below the list display field 61 are a BACK button 62 and a VIEW button 63. The BACK button 62 is used to go back to the previous screen. The VIEW button 63 allows browsing the contents of a folder. Specifically, in the case where the user has selected a specific folder (as opposed to a file), he/she can see the available files in the selected folder by pressing the VIEW button 63.

Referring back to FIG. 13, the following step will be executed after the data is selected at step S43.

(Step S44) The connection requester 260 consults the device information stored in the device information memory 230 to select which device will download data. Specifically, the connection requester 260 outputs the device information on a monitor screen of the mobile terminal 200 and prompts user B to choose a desired device. When user B specifies a specific device, the connection requester 260 selects that device as an entity that is to request data.

Figure 15:
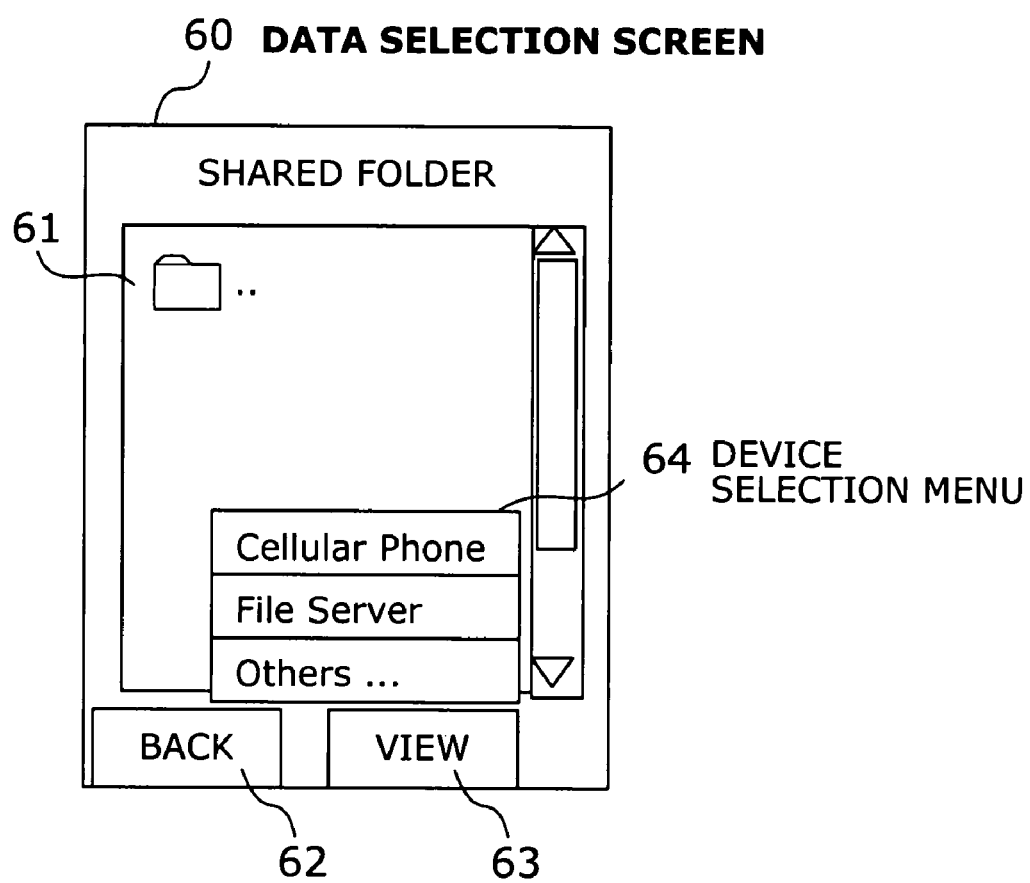
FIG. 15 shows an example screenshot of a device selection menu.

FIG. 15 shows an example screenshot of a device selection menu. The illustrated data selection screen 60 allows the user to view a device selection menu 64 by pressing a certain key. This device selection menu 64 gives the user a list of device names indicated by the device information stored in the device information memory 230. When the user specifies one of those names, the connection requester 260 selects the device corresponding to that name.

Referring back to FIG. 13, the following step will be executed after the requesting device is selected at step S44.

(Step S45) The connection requester 260 sends a connection request 45 to the mobile terminal 100.

FIG. 16 shows an example data structure of this connection request 45. Specifically, the connection request 45 carries the following parameters: "ACTION," "CONTENT," and "DEVICE ID." The ACTION parameter indicates that this request message is asking an access permission. The CONTENT parameter gives the information that uniquely identifies the desired data. The DEVICE ID parameter gives the identifier of a specific device to which the data should be addressed. In the present example, the file server 600 is specified as the destination of the data.

Referring back to FIG. 13, the following steps will be executed after a connection request is sent out at step S45.

(Step S46) The connection request router 170 in the mobile terminal 100 forwards the connection request 45 from the mobile terminal 200 to the gateway 300.

(Step S47) In the gateway 300, the device registration handler 320 extracts a device ID from the connection request 45 and enters it to the ticket management table 350. The device registration handler 320 then asks the access ticket issuer 330 to issue an access ticket. The access ticket issuer 330 thus issues a first access ticket 46 according to the connection request 45 and sends it back to the mobile terminal 100. The access ticket issuer 330 also registers the issued first access ticket 46 with the ticket management table 350.

FIG. 17 shows an example data structure of the first access ticket 46. This first access ticket 46 has two parameters named "TICKET DATA" and "EXPIRATION DATE." The TICKET DATA parameter gives a code that uniquely identifies the first access ticket 46. This code is referred to as "ticket data" and serves as one of the keys that permit access to the secure network 30. The access ticket issuer 330 may produce a random value for use as ticket data. Alternatively, ticket data may be produced with a hash function based on a secret key owned by the gateway 300, together with the path and file information on available content data, the device ID of the requesting device, and other information. The EXPIRATION DATE parameter indicates until when the first access ticket 46 is valid. The date is calculated by adding a predetermined time to the date and time at which the access ticket issuer 330 received the connection request 45.

Referring back to FIG. 13, the following steps will be executed after the first access ticket 46 is sent out at step S47.

(Step S48) The access ticket router 180 in the mobile terminal 100 forwards the first access ticket 46 from the gateway 300 to the mobile terminal 200.

(Step S49) Upon receipt of the first access ticket 46 from the mobile terminal 100, the access ticket requester 270 in the mobile terminal 200 sends a ticket request 47 to the gateway 400.

FIG. 18 shows an example data structure of this ticket request 47. Specifically, the ticket request 47 contains two parameters named "ACTION" and "DEVICE ID." The ACTION parameter indicates that this request message is asking the recipient to issue a ticket. The DEVICE ID parameter gives the identifier of a destination device to which the data should be addressed. In the present example, the file server 600 is specified as the destination. The ticket request 47 also carries the first access ticket 46 as an attachment.

Referring back to FIG. 13, the following step will be executed after the ticket request 47 is sent out at step S49.

(Step S50) Upon receipt of the ticket request 47, the access ticket issuer 420 in the gateway 400 issues a second access ticket 48 including ticket data and its expiration date. Specifically, the access ticket issuer 420 produces a random value for use as ticket data and determines the expiration date of the second access ticket such that it will expire after a predetermined time. The access ticket issuer 420 enters the produced ticket data in the ticket management table 430, together with a device ID extracted from the received ticket request 47 and the ticket data of the first access ticket 46. Finally the access ticket issuer 420 sends a second access ticket 48 to the mobile terminal 200.

FIG. 19 shows an example data structure of the ticket management table 430 on the requesting party. The illustrated ticket management table 430 has the following data fields: "DEVICE ID," "FIRST TICKET DATA," and "SECOND TICKET DATA." The DEVICE ID field gives the identifier of a destination device to which the data should be addressed. The FIRST TICKET DATA field contains ticket data that the first access ticket 46 has delivered earlier. The SECOND TICKET DATA field contains ticket data produced for the second access ticket 48.

FIG. 20 shows an example data structure of the second access ticket 48. The illustrated second access ticket 48 has two parameters named "TICKET DATA" and "EXPIRATION DATE." The TICKET DATA parameter gives a code that uniquely identifies the second access ticket 48. This code serves as one of the keys that permit access to the secure network 30. The EXPIRATION DATE parameter indicates until when the second access ticket 48 is valid. The date is calculated by adding a predetermined time to the date and time at which the access ticket issuer 420 received the ticket request 47.

Referring back to FIG. 13, the following steps are executed after the second access ticket 48 is sent out at step S50.

(Step S51) When the second access ticket 48 is returned in response to the ticket request 47, the access ticket requester 270 in the mobile terminal 200 forwards that second access ticket 48 to the mobile terminal 100.

(Step S52) The access ticket router 180 in the mobile terminal 100 further forwards the second access ticket 48 from the mobile terminal 200 to the gateway 300.

(Step S53) The access ticket registration handler 340 in the gateway 300 enters the content of the received second access ticket 48 to the ticket management table 350.

FIG. 21 shows an example data structure of the ticket management table 350 on the sending side. The illustrated ticket management table 350 has the following data fields: "DEVICE ID," "FIRST TICKET DATA," and "SECOND TICKET DATA." The DEVICE ID field gives the identifier of a specific device to which the data should be addressed.

The FIRST TICKET DATA field contains ticket data of the first access ticket 46. Specifically, the FIRST ACCESS TICKET field is divided into "DATA" and "EXPIRATION DATE" subfields. The DATA subfield contains ticket data of the first access ticket 46, and the EXPIRATION DATE" subfield indicates until when the first access ticket 46 is valid.

The SECOND TICKET DATA field contains ticket data of the second access ticket 48. Specifically, the SECOND ACCESS TICKET field is divided into "DATA" and "EXPIRATION DATE" subfields. The DATA subfield contains ticket data of the second access ticket 48, and the EXPIRATION DATE subfield indicates until when the second access ticket 48 is valid.

The ticket management table 350 shown in FIG. 21 is an example in the case where access is controlled regardless of the content of data. The present embodiment may be modified such that an access ticket be issued for each individual data to be accessed. In this case, the ticket management table 350 will have an additional data field named "CONTENT URL." This CONTENT URL field stores CONTENT field values of the connection request 45 (see FIG. 16).

Referring back to FIG. 13, the following steps are executed after the second access ticket 48 is registered at step S53.

(Step S54) The access ticket registration handler 340 sends a registration completion notice to notify the mobile terminal 100 that the gateway 300 has finished registration of the second access ticket 48.

(Step S55) Upon receipt of the registration completion notice, the data download commander 190 in the mobile terminal 100 sends a data download command 49 to the mobile terminal 200. The data download commander 190 may be designed to output some message on a screen of the mobile terminal 100 to indicate that it is ready to execute a data transfer. If this is the case, the data download commander 190 sends a data download command 49 to initiate a data transfer when the user (user A) instructs to do so.

The data download commander 190 has kept a data identifier in a memory space, which has been received from the connection request router 170. When a registration completion notice is received, the data download commander 190 retrieves the data identifier from the memory space and includes it to the data download command 49.

FIG. 22 shows an example data structure of the data download command 49. Specifically, the data download command 49 contains two parameters named "ACTION" and "CONTENT." The ACTION parameter indicates that the command is requesting the recipient to download to the data specified by a data identifier (e.g., URL) that the CONTENT parameter gives.

Referring back to FIG. 13, the following step will be executed after the data download command 49 is sent out at step S55.

(Step S56) Upon receipt of the data download command 49, the data download command router 280 in the mobile terminal 200 forwards it to the gateway 400.

The mobile terminals 100 and 200 interact with their users during the course of the above-described steps. As a result, a data download command 49 is issued to initiate a data transfer process.

Figure 23:
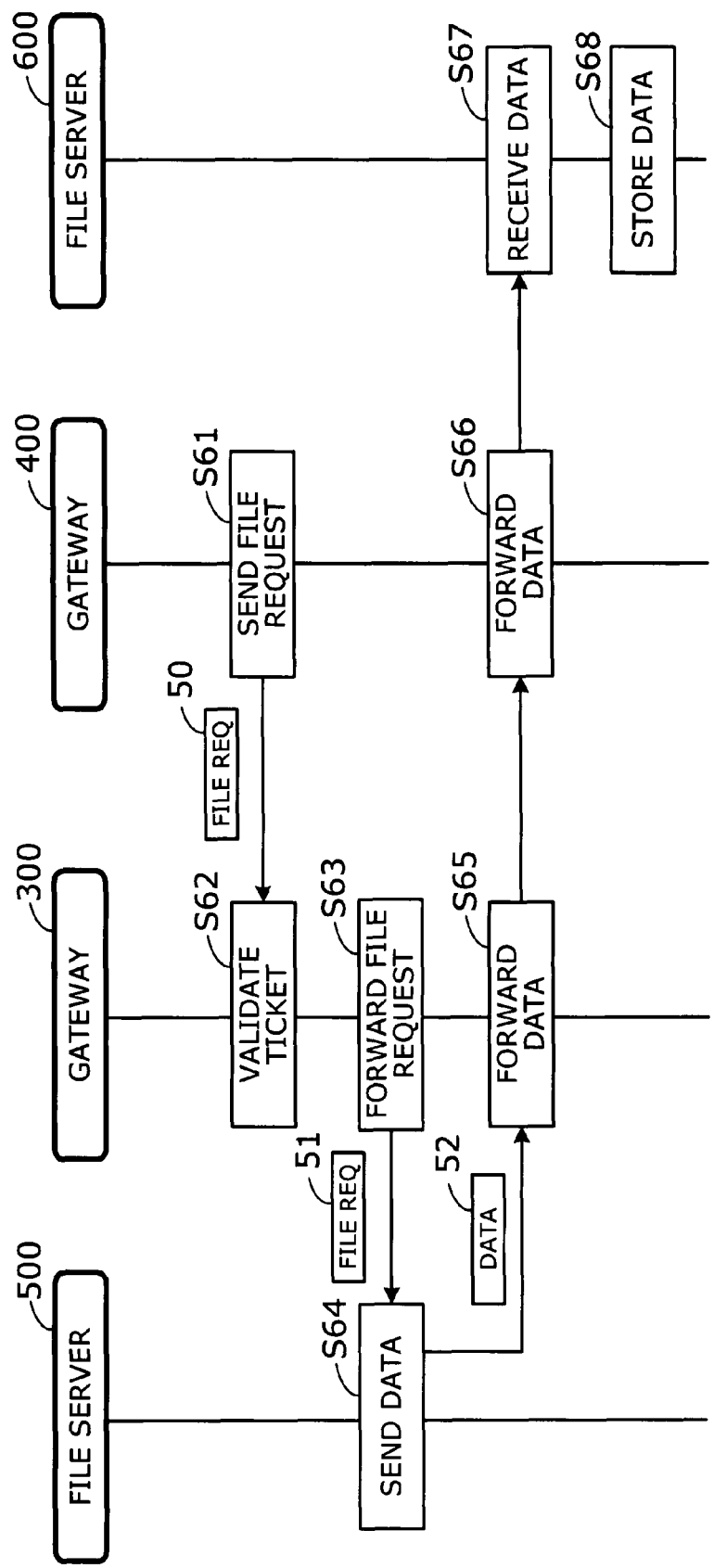
FIG. 23 is a sequence diagram showing a data transfer process.

FIG. 23 is a sequence diagram showing a data transfer process. This process includes the following steps:

(Step S61) In the gateway 400, the received data download command 49 causes the data requester 440 to send a file request 50 to the gateway 300.

Figure 24:
FIG. 24 shows an example data structure of a file request.

FIG. 24 shows an example data structure of a file request 50. This file request 50 contains the following parameters: "ACTION," "CONTENT," "FIRST TICKET DATA," "SECOND TICKET DATA," and "DEVICE ID." The ACTION parameter indicates that the sender is attempting to download specific data. The CONTENT parameter specifies requested data by using its unique identifier (e.g., URL). The FIRST TICKET DATA and SECOND TICKET DATA parameters show the ticket data that the first access ticket 46 and second access ticket 48 have delivered earlier. The DEVICE ID parameter gives a device ID specifying the destination of the requested data.

Note that the data download command 49 (see FIG. 22) only gives the value of CONTENT parameter (URL). To fill in the other parameters of the file request 50, the data requester 440 consults the ticket management table 430. More specifically, the gateway 400 and mobile terminal 200 are interconnected by a VPN connection and can transport both a ticket request 47 and a data download command 49 using the same connection. When a data download command 49 arrives through a particular connection, the data requester 440 consults the ticket management table 430 to extract therefrom the device ID, first ticket data, and second ticket data that have been registered in response to a ticket request 47 of the same connection. The data requester 440 then compiles a file request 50 from the CONTENT parameter of the received data download command 49 and the information extracted from the ticket management table 430.

Referring back to FIG. 23, the following steps will be executed after the file request 50 is sent out at step S61.

(Step S62) The access controller 360 in the receiving gateway 300 checks whether the ticket data in the received file request 50 are all valid. The details of this step will be described later.

(Step S63) If the ticket data are validated, the access controller 360 sends a file request 51 to the file server 500.

FIG. 25 shows an example data structure of the file request 51 that is sent to the file server 500. This file request 51 is a reduced version of the original file request 50 from the gateway 400. Specifically, the file request 51 eliminates ticket data and device ID.

Referring back to FIG. 23, the following steps will be executed after the file request 51 is sent out at step S63.

(Step S64) Upon receipt of the file request 51, the data publisher 530 in the file server 500 makes access to the content storage unit 510, thus retrieving the data specified by the CONTENT parameter in the received file request 51. The data publisher 530 then transmits the retrieved data 52 as a response to the file request 51.

(Step S65) The access controller 360 in the gateway 300 forwards the data 52 from the file server 500 to the gateway 400.

(Step S66) The data requester 440 in the gateway 400 receives the data 52 as a response to its file request 50. The received data 52 is then forwarded to the file server 600, which is the destination device specified by DEVICE ID in the file request 50.

(Step S67) The data downloader 630 in the file server 600 receives the data 52 from the gateway 400.

(Step S68) The data downloader 630 stores the received data 52 in the content storage unit 610.

The above-described steps enable a file server 500 in one secure network 30 to transfer data to a remote file server 600 in another secure network 40, under the control of mobile terminals 100 and 200.

Figure 26:
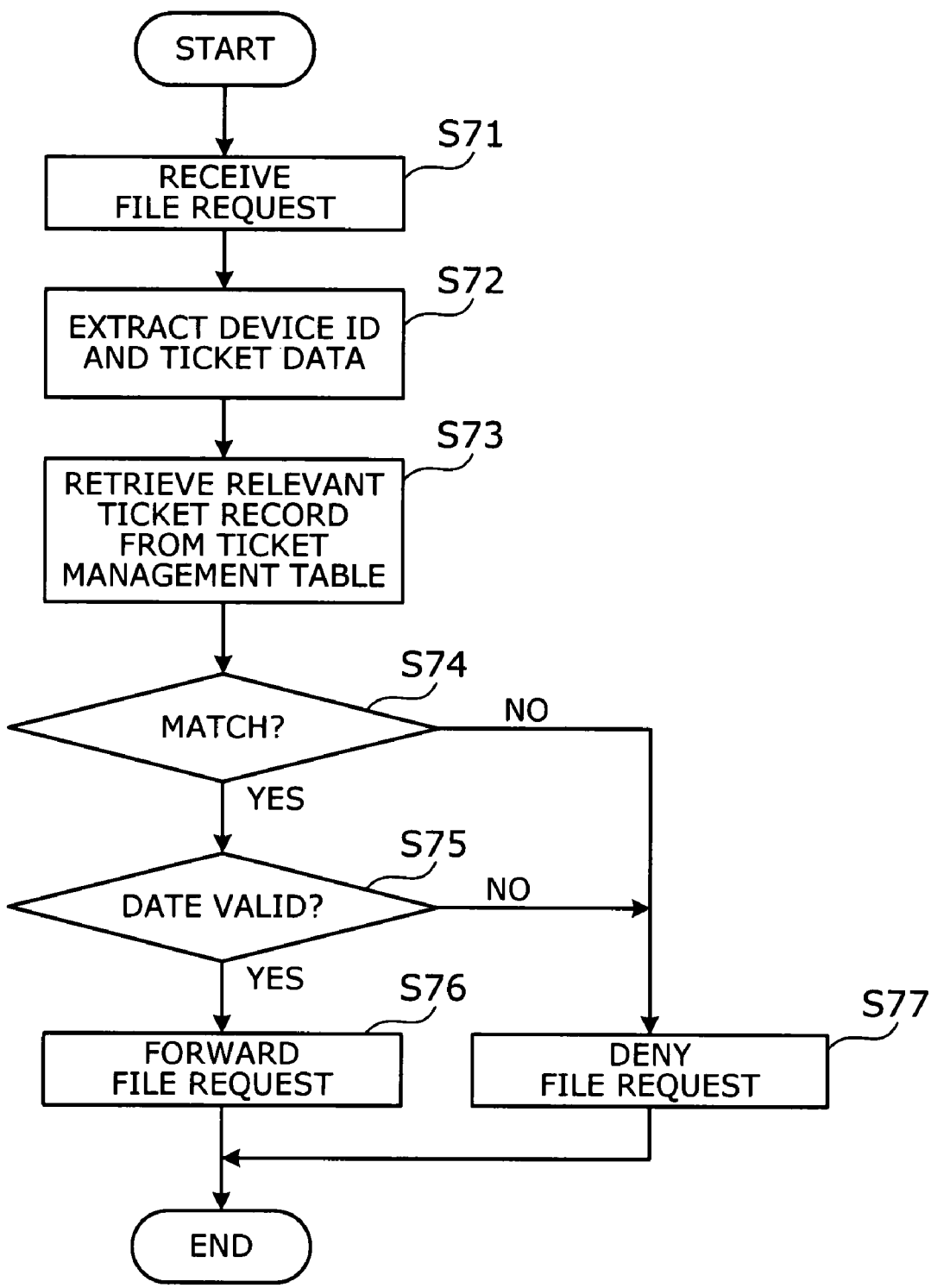
FIG. 26 is a flowchart of a ticket validation process.

Referring now to the flowchart of FIG. 26, the following will give details of how the access tickets are validated. Specifically, this process includes the following steps:

(Step S71) The access controller 360 in the gateway 300 receives a file request 50.

(Step S72) The access controller 360 extracts first and second ticket data and a device ID out of the received file request 50.

(Step S73) The access controller 360 searches the ticket management table 430 for a ticket record that matches with the first and second ticket data and device ID extracted at step S72.

(Step S74) The access controller 360 determines whether the above step S73 has successfully found a match. If a match is found, the process advances to step S75. If not, the process branches to step S77.

(Step S75) The access controller 360 determines whether the current date and time is not later than the expiration date stated in each of the found first and second access tickets. If this condition is satisfied on both accounts, the process advances to step S76. If one or both of the two tickets are found expired, the process branches to step S77.

(Step S76) The access controller 360 sends a file request 51 to the file server 500, which is produced from the received file request 50 by removing its ticket data and device ID, and exits from the present process.

(Step S77) The access controller 360 decides to deny the file request 50 and returns an error message back to the gateway 400, instead of transferring the requested data, and exits from the present process.

As can be seen from the above explanation, the present embodiment enables two users A and B to transfer data from user A's home file server 500 to user B's home file server 600 by operating their mobile terminals 100 and 200 when they are away from their respective homes. The mobile terminals 100 and 200 are used as part of a secure communication path to transfer ticket data (or key information) required for remote access to the secure network 30. The substantive data, on the other hand, is transported directly to the destination, bypassing the mobile terminals 100 and 200. The present embodiment thus enables high-speed data transfer, independently of the performance of mobile terminals 100 and 200. The present embodiment also enables the secure network 30 to pass its local data to other parties without degrading its security.

Second Embodiment

Figure 27:
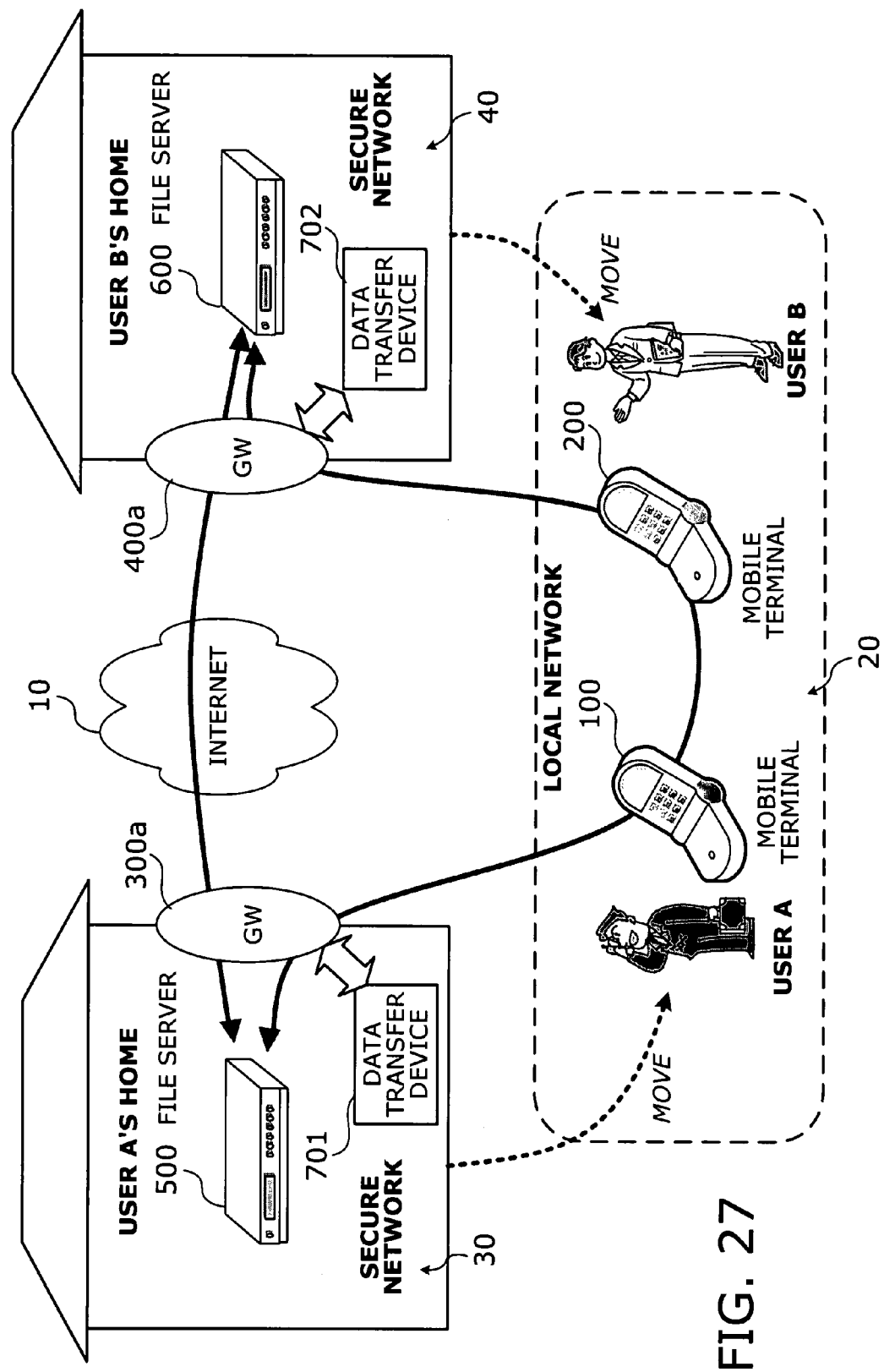
FIG. 27 shows an example system configuration according to a second embodiment of the present invention.

This section describes a second embodiment of the present invention, which offers the same service as that of the first embodiment by using existing gateways. FIG. 27 shows an example system configuration according to the second embodiment of the present invention. Since the second embodiment is nearly the same as the first embodiment, like reference numerals to refer to like elements, and their description will not be repeated.

According to the second embodiment, some functions of the gateway 300 in the first embodiment are implemented as a data transfer device 701. The gateway in the second embodiment is thus referred to by a different reference numeral "300a." Recall that the gateway 300 shown in FIG. 6 has, among others, a VPN controller 310 and an access controller 360. In the second embodiment, the VPN controller 310 remains in the gateway 300a, as does the data transfer function of the access controller 360. The other elements, including ticket validation functions of the access controller 360, are moved to the data transfer device 701.

Likewise, the functions of the gateway 400 in the first embodiment are implemented in a gateway 400a and a data transfer device 702 in a distributed manner. More specifically, recall that the gateway 400 shown in FIG. 7 has a VPN controller 410. This VPN controller 410 remains as part of the gateway 400a, while the other elements are moved to the data transfer device 702.

The resulting gateways 300a and 400a only have ordinary functions as gateway devices. That is, the existing gateways 300a and 400a, if combined with additional data transfer devices 701 and 702, offer the same services as in the first embodiment.

The data transfer device 701 may also be implemented as an integral part of the file server 500. Likewise, the data transfer device 702 may be incorporated into the file server 600. This variation of the second embodiment can also serve the same purpose as the first embodiment.

Third Embodiment

This section describes a third embodiment of the present invention, which includes a shared storage server for relaying data from a source file server in user A's home to a destination file server in user B's home. The third embodiment may involve a plurality of shared storage servers. In this case, user A is allowed to specify which shared storage server to use, through his/her mobile terminal. Some network service providers offer shared storage servers as one of their service products. When using such commercial service to implement the invention, the data should be stored in encrypted form to ensure the security.

Figure 28:
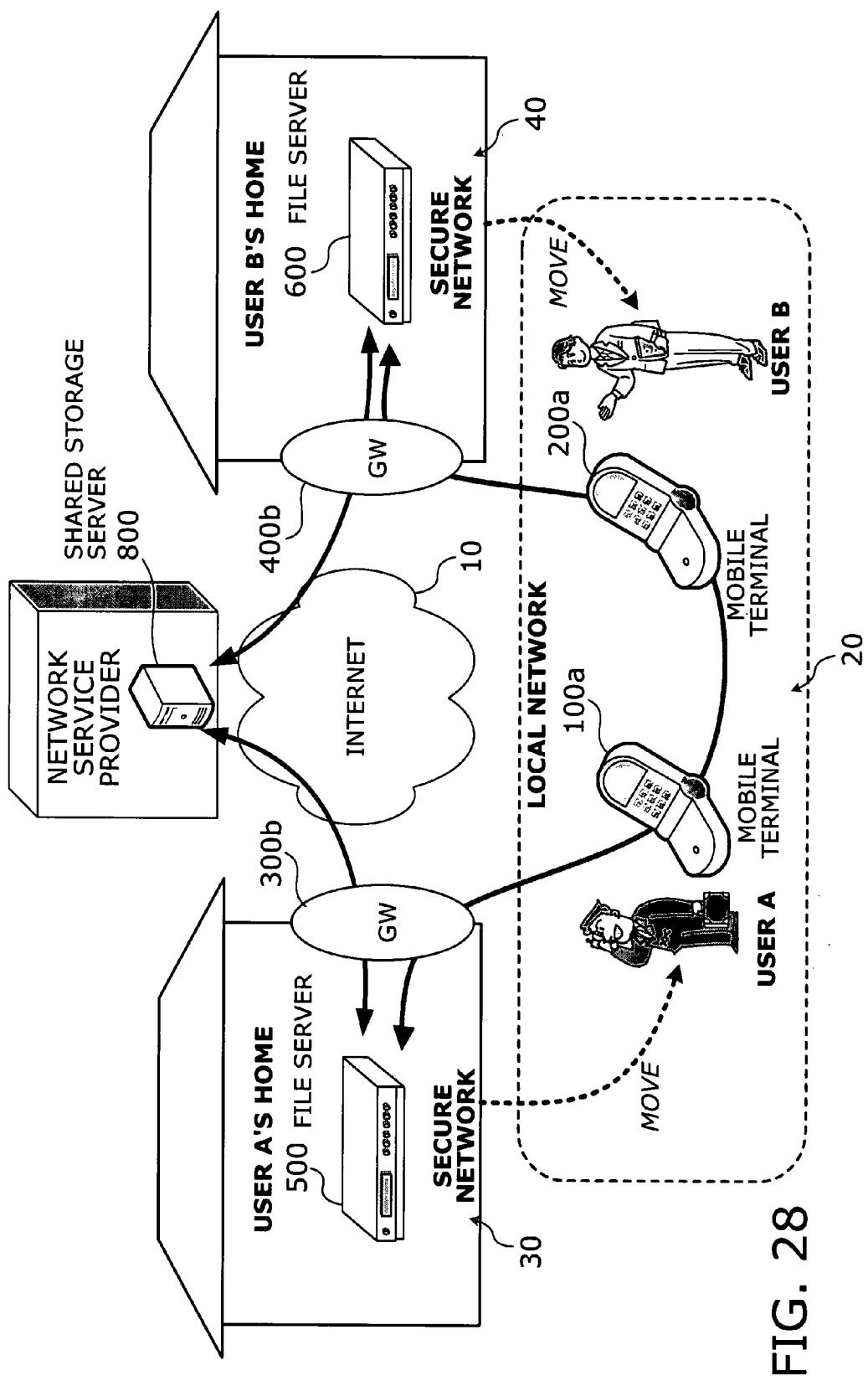
FIG. 28 shows an example system configuration according to a third embodiment of the present invention.

FIG. 28 shows an example system configuration according to the third embodiment of the present invention. This system uses a mobile terminal 100a to produce an encryption key (not shown). The encryption key is then passed to a gateway 300b through a reliable communication path (e.g., VPN), thus permitting the gateway 300b to encrypt data when uploading it in a shared storage server 800.

The produced encryption key is also passed to another gateway 400b through another mobile terminal 200a. The delivery of such key information can be performed safely by using a reliable communication path (e.g., VPN) established between the sending mobile terminal 200a and the receiving gateway 400b.

The gateway 400b downloads data from the shared storage server 800 and decrypts the data by using the encryption key that has been provided earlier from the mobile terminal 100a. The decrypted data is then transferred to and stored in the file server 600.

In this way, the third embodiment makes it possible to transfer data safely through the use of an existing storage service without the need for modifying the gateways 300 and 400.

Figure 29:
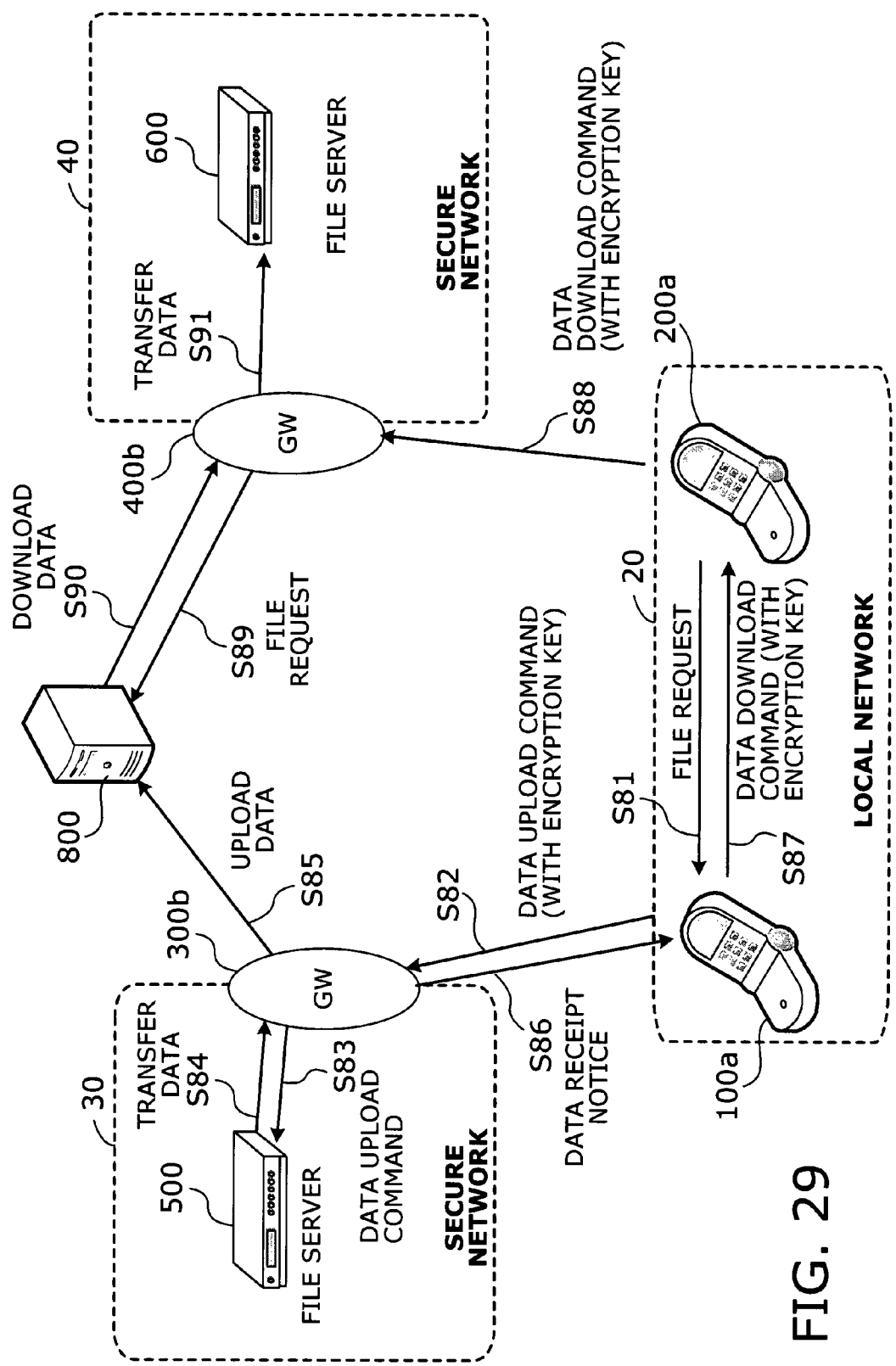
FIG. 29 gives an overview of how the third embodiment operates.

FIG. 29 gives an overview of how the third embodiment operates. In operation, the mobile terminal 200a first sends a file request to the mobile terminal 100a via a local network 20 (step S81). Upon receipt of this file request, the mobile terminal 100a produces an encryption key and sends it as part of a data upload command to the gateway 300b (step S82).

The gateway 300b sends the data upload command to the file server 500 (step S83), which causes the specified data to be transferred from the file server 500 to the gateway 300b (step S84). The gateway 300b encrypts the data with the encryption key provided from the mobile terminal 100a. The encrypted data is then uploaded from the gateway 300b to the shared storage server 800 (step S85) and stored in a storage device of the shared storage server 800.

Now that the encrypted data is uploaded, the gateway 300b sends a data receipt notice to the mobile terminal 100a (step S86). In response to this data receipt notice, the mobile terminal 100a sends a data download command to the mobile terminal 200a, including the encryption key (step S87). The mobile terminal 200a forwards the data download command including the encryption key to the gateway 400b (step S88).

The data download command causes the gateway 400b to send a file request to the shared storage server 800 after saving the encryption key (step S89). The shared storage server 800 responds to the file request by sending the encrypted data back to the gateway 400b (step S90). The receiving gateway 400b decrypts the encrypted data with the encryption key and provides the file server 600 with the data in plain text form (step S91).

Elements of Third Embodiment

Figure 30:
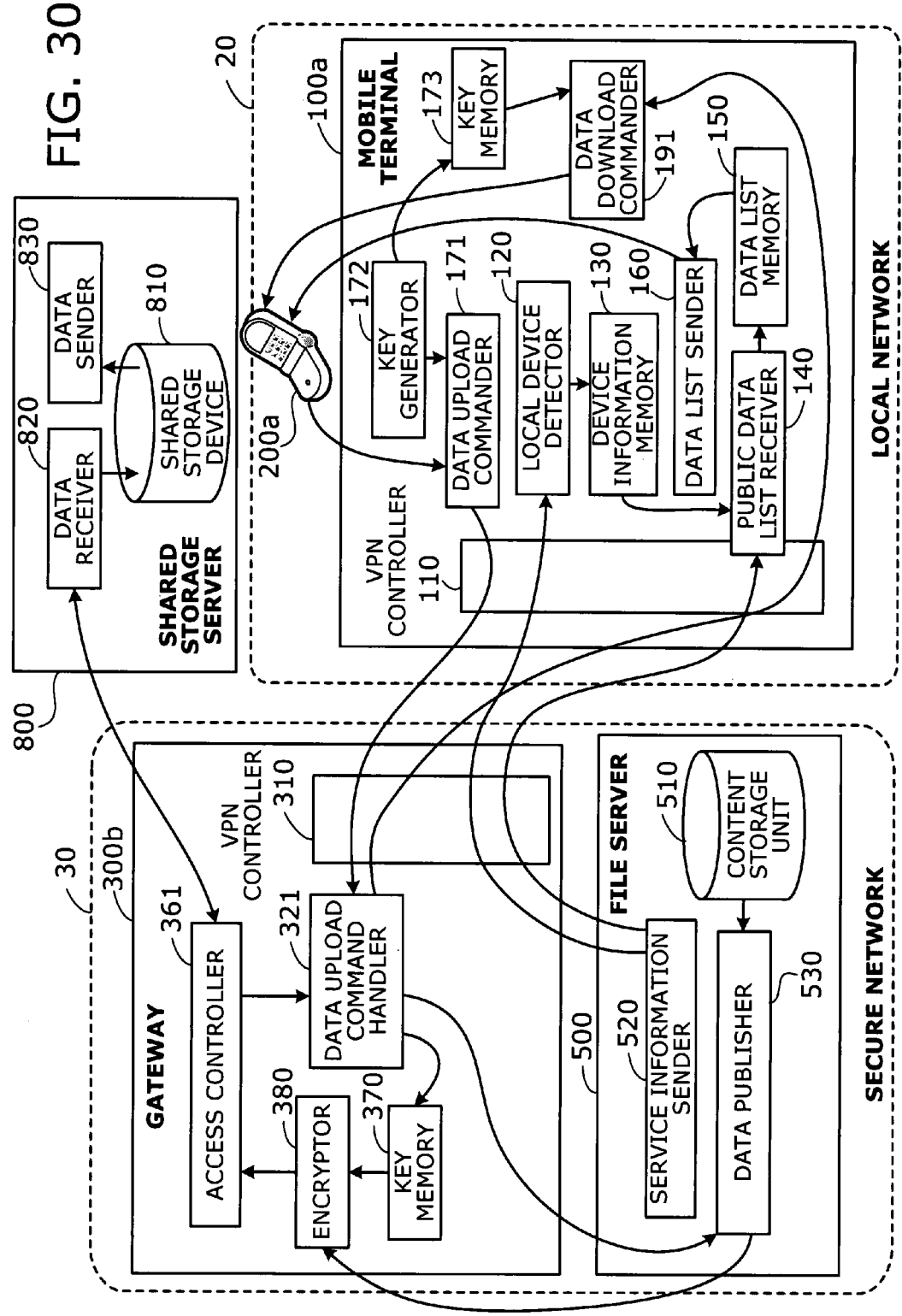
FIG. 30 is a functional block diagram of devices that user A owns.

This section will describe the functional elements realizing the above-outlined feature of the third embodiment. FIG. 30 is a functional block diagram of devices that user A owns. Since the third embodiment of FIG. 30 is nearly the same as the first embodiment of FIG. 6, like reference numerals to refer to like elements, and their description will not be repeated.

According to the third embodiment, the mobile terminal 100a has a data upload commander 171, a key generator 172, and a key memory 173 in place of the connection request router 170 and access ticket router 180 in the first embodiment. The third embodiment also differs from the first embodiment in how its data download commander 191 behaves, in contrast to the data download commander 190 (FIG. 6) of the first embodiment.

Upon receipt of a file request from the mobile terminal 200a, the data upload commander 171 asks the key generator 172 to produce an encryption key. The data upload commander 171 includes this encryption key in a data upload command when sending it to the gateway 300b. The key generator 172 produces a key (e.g., a random number) upon request from the data upload commander 171. The key generator 172 stores the produced encryption key in the key memory 173, besides passing it to the data upload commander 171. The key memory 173 is a storage space for encryption keys. Specifically, the memory device of the mobile terminal 100a is partly allocated for this purpose. The data download commander 191 sends a data download command to the mobile terminal 200a, together with the encryption key, when a data receipt notice is received from the gateway 300b.

According to the third embodiment, the gateway 300b has a data upload command handler 321, a key memory 370, and an encryptor 380 in place of the device registration handler 320, access ticket issuer 330, access ticket registration handler 340, and ticket management table 350 in the first embodiment (FIG. 6). Also, the gateway 300b of the third embodiment has an access controller 361, whose function is dissimilar to its counterpart in the first embodiment, the access controller 360 (FIG. 6).

The data upload command handler 321 extracts a key from a data upload command received from the mobile terminal 100a and saves the extracted key in the key memory 370. In addition, the data upload command handler 321 forwards the data upload command to the file server 500, excluding the key. The key memory 370 is a storage space for encryption keys. Specifically, a part of RAM of the gateway 300b is allocated for this purpose.

The encryptor 380 retrieves the encryption key out of the key memory 370 when data is received from the file server 500. The encryptor 380 then encrypts the received data with that encryption key and passes the resulting encrypted data to the access controller 361. The access controller 361 transfers the received encrypted data to its destination in a shared storage space that the data upload command specifies in the form of URL.

The shared storage server 800 has a shared storage device 810, a data receiver 820, and a data sender 830. The shared storage device 810 provides a storage space for data files. Specifically, a part of a hard disk drive in the shared storage server 800 may be allocated to this purpose. The data receiver 820 receives data uploaded from the gateway 300b and stores it in the shared storage device 810. The data sender 830 retrieves data from the shared storage device 810 when a file request is received from the gateway 400b and sends it to the requesting gateway 400b.

Figure 31:
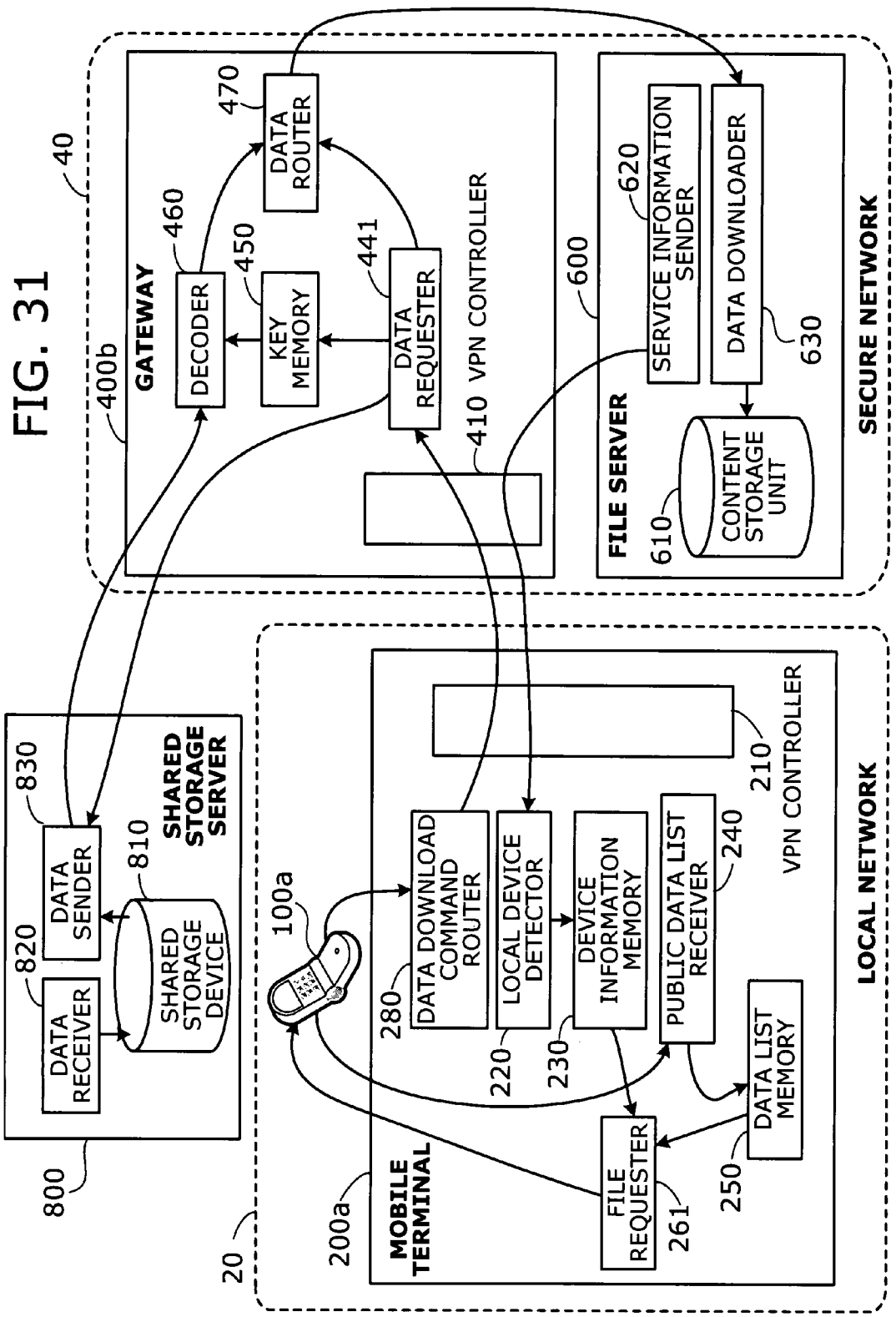
FIG. 31 is a functional block diagram of devices that user B owns.

FIG. 31 is a functional block diagram of devices that user B owns. Because of the similarity between the third embodiment shown in FIG. 31 and the first embodiment shown in FIG. 7, like reference numerals are used to refer to like elements, and their description will not be repeated.

In the third embodiment, the mobile terminal 200a of user B has a file requester 261 in place of the connection requester 260 and access ticket requester 270 in the first embodiment (FIG. 7). The file requester 261 interacts with user B to select a specific data file from among those in a data list stored in the data list memory 250, and also to select a destination device from among those registered in the device information memory 230. The file requester 261 then sends a file request to the mobile terminal 100a. This file request specifies the selected data and includes device information of the selected destination device.

According to the third embodiment, the gateway 400b has a key memory 450, decoder 460, and data router 470 in place of the access ticket issuer 420 and ticket management table 430 in the first embodiment (FIG. 7). Also, the gateway 400b of the third embodiment has a data requester 441 that functions differently from its counterpart in the first embodiment, the data requester 440 (FIG. 7).

The data requester 441 extracts a key from a data download command received from the gateway 400b and saves it in the key memory 450. The data requester 441 also sends a file request to the shared storage server 800 in response to the data download command. The key memory 450 is a storage space for key data. Specifically, a part of RAM of the gateway 400b is allocated for this purpose.

The decoder 460 retrieves a key out of the key memory 450 when data is received from the shared storage server 800 in encrypted form. The decoder 460 uses this key to decrypt the received data. The resulting plaintext data is then passed to the data router 470. The data router 470 sends the data to the file server 600.

Data Transfer in Third Embodiment

This section will describe how the data stored in the file server 500 in user A's home is transferred to the file server 600 in user B's home. The first and third embodiments share the preparatory processes shown in FIGS. 8 and 12, which have been described earlier in the first embodiment. This section will not repeat their description. The two embodiments also share the first four steps S41 to S44 of FIG. 13. This section will therefore focus on what follows S44 in the third embodiment.

Figure 32:
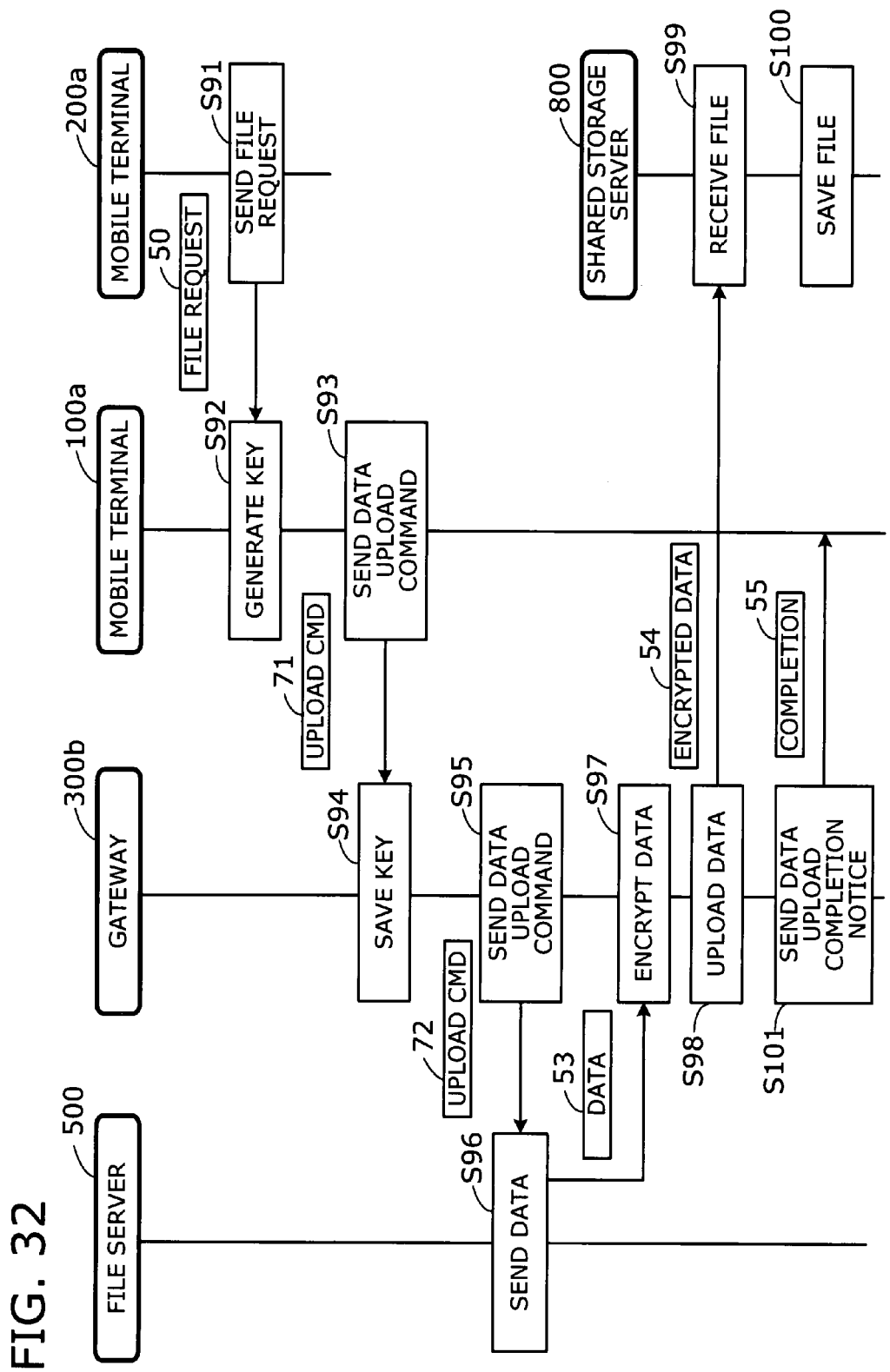
FIG. 32 is a sequence diagram showing a process of uploading data to a shared storage server.

FIG. 32 is a sequence diagram showing a process of uploading data to a shared storage server. This process includes the following steps:

(Step S91) The file requester 261 in the mobile terminal 200a interacts with user B to select data and its destination. The file requester 261 then sends a file request 50 to the mobile terminal 100a.

FIG. 33 shows an example data structure of this file request 50. Specifically, the file request 50 contains the following parameters: "ACTION," "CONTENT," and "DEVICE ID." The ACTION parameter indicates that the sender is attempting to download specific data. The CONTENT parameter specifies the requested data by using its unique identifier (e.g., URL). The DEVICE ID parameter specifies the destination of the data. In the present example, this parameter gives a device ID of the file server 600.

Referring back to FIG. 32, the following steps will be executed after the file request 50 is sent out at step S91.

(Step S92) In response to the file request 50, the key generator 172 in the mobile terminal 100a produces an encryption key. The key generator 172 passes this encryption key to the data upload commander 171, as well saving it in the key memory 173.

(Step S93) The data upload commander 171 sends a data upload command 71 to the gateway 300b to initiate uploading of the data specified by the CONTENT parameter of the received file request 50. At this step the data upload commander 171 selects the URL of a particular storage area (folder) in the shared storage server 800, according to commands from user A. Alternatively, the data upload commander 171 may be given such a URL beforehand.

Preferably, the shared storage server 800 is accessible to both the file server 500 and mobile terminal 100a. In this case, the data upload commander 171 may provide the file server 500 with a list of shared storage servers accessible to the mobile terminal 100a and, in return for that, receive a modified version of that list from the file server 500, so that the received list will enumerate only the shared storage servers accessible to both the mobile terminal 100a and file server 500. The data upload commander 171 outputs the received list on a monitor screen of the mobile terminal 100a, thus prompting user A to select a specific shared storage server. The data upload commander 171 then determines that the selected shared storage server be the destination to which the data is to be uploaded. The present example assumes that user A has specified a folder in the shared storage server 800.

FIG. 34 shows an example data structure of a data upload command. This data upload command 71 contains the following parameters: "ACTION," "CONTENT," "SHARED STORAGE," and "ENCRYPTION KEY." The ACTION parameter indicates that the command is requesting the recipient to upload specific data. The CONTENT parameter specifies the requested data by using its unique identifier (e.g., URL). The SHARED STORAGE parameter contains a unique identifier (e.g., URL) specifying a folder in the shared storage server to which the data should be uploaded. The ENCRYPTION KEY parameter gives the encryption key that the key generator 172 has produced.

Referring back to FIG. 32, the following steps will be executed after the data upload command 71 is sent out at step S93.

(Step S94) The data upload command handler 321 in the gateway 300b extracts an encryption key from the received data upload command 71 and saves it in the key memory 370.

(Step S95) The CONTENT parameter of the data upload command 71 shows the data upload command handler 321 that the requested data is under control of the file server 500. The data upload command handler 321 then sends a data upload command 72 to that file server 500.

Figure 35:
FIG. 35 shows an example data structure of a data upload command sent from a gateway.

FIG. 35 shows an example data structure of a data upload command that the gateway 300b sends. This data upload command 72 has three parameters named "ACTION," "CONTENT," and "SHARED STORAGE," which serve the same purpose as their counterparts in the data upload command 71 of FIG. 34. That is, the data upload command 72 is produced from the data upload command 71 by removing its ENCRYPTION KEY parameter.

Referring back to FIG. 32, the following steps will be executed after the data upload command 72 is sent out at step S95.

(Step S96) The data publisher 530 in the file server 500 searches the content storage unit 510 to retrieve data 53 specified by the CONTENT parameter in the data upload command 72. The data publisher 530 then sends the retrieved data 53 back to the gateway 300b. More specifically, the data 53 is addressed to the URL indicated by CONTENT of the data upload command 72.

(Step S97) The encryptor 380 in the gateway 300b receives the data 53 from the file server 500. Subsequently the encryptor 380 consults the key memory 370 to obtain a relevant encryption key and encrypts the data 53 with that encryption key, thus outputting encrypted data 54 to the access controller 361.

(Step S98) The access controller 361 forwards the encrypted data 54 to the specified destination device (shared storage server 800 in the present example).

(Step S99) The data receiver 820 in the shared storage server 800 receives the encrypted data 54.

(Step S100) The data receiver 820 saves the encrypted data 54 in the shared storage device 810.

(Step S101) In the gateway 300b, the data upload command handler 321 finds that the access controller 361 has successfully transmitted the encrypted data 54. The data upload command handler 321 then sends a data upload completion notice 55 to the mobile terminal 100a.

Figure 36:
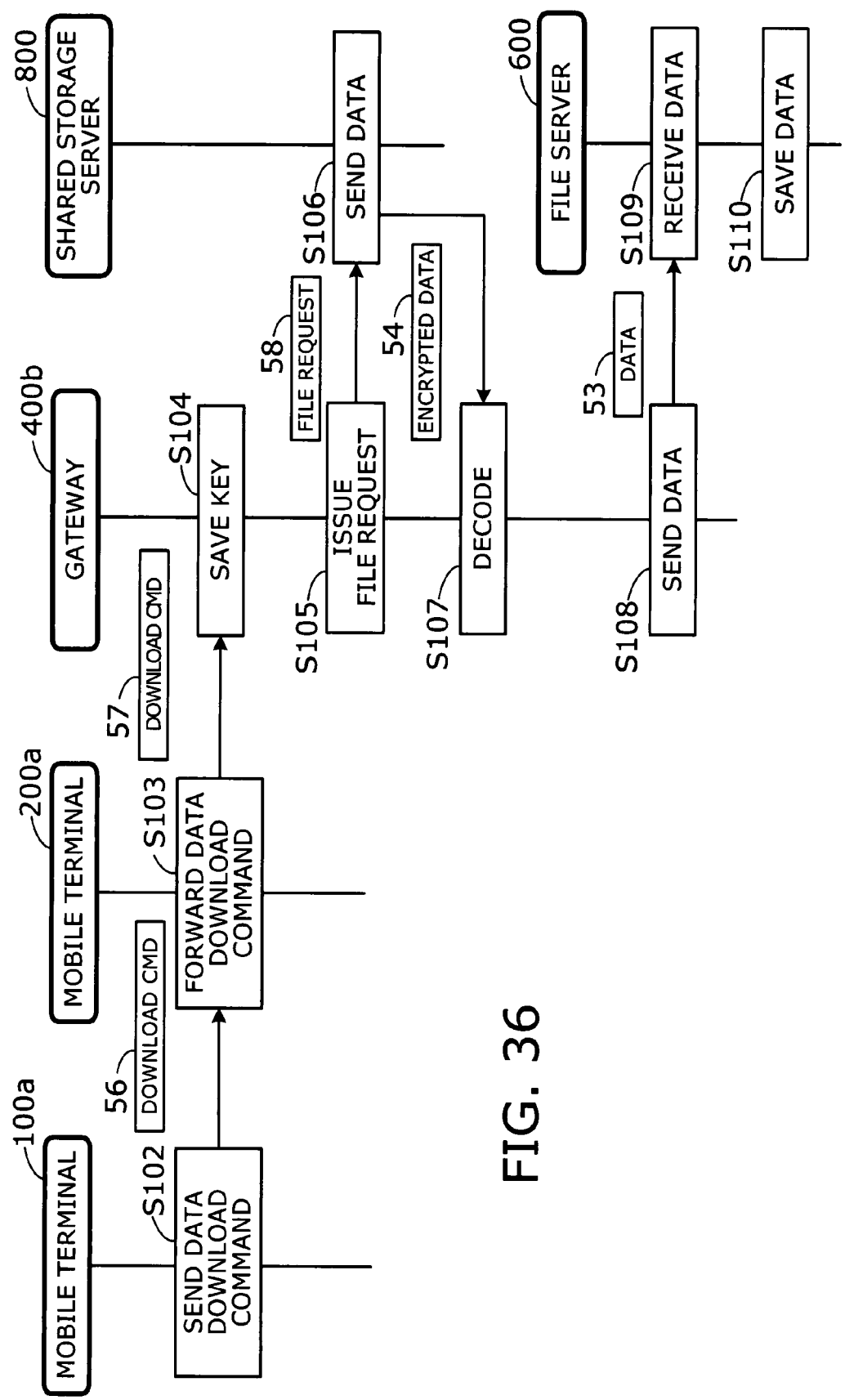
FIG. 36 is a sequence diagram showing how data is downloaded from a shared storage server.

FIG. 36 is a sequence diagram showing how data is downloaded from the shared storage server 800. This process includes the following steps:

(Step S102) Upon receipt of a data receipt notice, the data download commander 191 in the mobile terminal 100a reads a relevant key out of the key memory 173 and then sends a data download command 56 to the mobile terminal 200a, including that key. This data download command 56 is also supposed to include a piece of information for identifying which folder in the shared storage server 800 accommodates the data of interest. This information has been given to the data upload commander 171, as mentioned earlier.

FIG. 37 shows an example data structure of the data download command 56. The illustrated data download command 56 has three parameters named "ACTION," "DATA URL," and "ENCRYPTION KEY." The ACTION parameter indicates that the command is requesting the recipient to make read access to specific data. The DATA URL parameter shows where in the shared storage server 800 the encrypted data 54 is stored. The encryption key parameter gives the encryption key used to encrypt the data 53.

Referring back to FIG. 36, the following step will be executed after the data download command 56 is sent out at step S102.

(Step S103) The data download command router 280 in the mobile terminal 200a forwards a modified version of the data download command 56 to the gateway 400b. Note that this data download command 57 includes the device ID of the file server 600 to indicate to which device the data has to be delivered.

FIG. 38 shows an example data structure of the data download command 57 sent to the gateway 400b. This data download command 57 has four parameters named "ACTION," "DATA URL," "ENCRYPTION KEY," and "DEVICE ID." The first three parameters have the same values as the data download command 56 explained in FIG. 37. The last parameter, DEVICE ID, specifies the destination of data. In the present example, this parameter gives the device ID of the file server 600.

Referring back to FIG. 36, the following steps will be executed after the data download command 57 is sent out at step S103.

(Step S104) The data requester 441 in the gateway 400b extracts an encryption key from the data download command 57 and saves it in the key memory 450. The data requester 441 also extracts a device ID from the data download command 57 and passes it to the data router 470.

(Step S105) The data requester 441 issues a file request 58 including the URL specified by the DATA URL parameter in the data download command 57.

(Step S106) In the shared storage server 800, the data sender 830 retrieves the encrypted data 54 out of the shared storage device 810 according to the file request 58. The retrieved data is sent back to the requesting gateway 400b in encrypted form.

(Step S107) The decoder 460 in the gateway 400b receives the encrypted data 54 from the shared storage server 800. The decoder 460 then decodes the encrypted data 54 with a relevant encryption key read out of the key memory 450, thus providing the data router 470 with the resulting data 53 in plaintext form.

(Step S108) The data router 470 sends the data 53 to the destination device specified by the device ID received from the data requester 441. In the present example, the file server 600 is the destination device.

(Step S109) The data downloader 630 in the file server 600 receives the data 53 from the gateway 400b.

(Step S110) The data downloader 630 saves the received data 53 in the content storage unit 610.

The above-described third embodiment transfers data via a shared storage device without the need for each secure network 30 and 40 to accept inbound access from external networks (except those via VPN). The third embodiment requires no modifications to the security functions of gateways, thus keeping the secure networks 30 and 40 from extra risks.

The third embodiment may be modified in the same way as in the second embodiment. That is, the gateway 300b and 400b of the third embodiment may be implemented as a combination of ordinary gateways and special data transfer devices. Also, the gateway functions specific to the present invention may be implemented as integral part of file servers 500 and 600.

While all the above-described first to third embodiments assume the use of two mobile terminals for different roles, one at the data provider (user A) and the other at the data recipient (user B), the present embodiment is not limited to that particular assumption. Rather, the proposed functions of mobile terminals can be integrated into a single mobile terminal. Likewise, all the proposed gateway functions may be implemented in both gateways. With such a full-function version of mobile terminals and gateways, the two users will be able to transfer their data files in both ways.

Computer-readable Storage Media

The above-described processing mechanisms of the present invention are actually implemented on a computer system. Computer instructions for each device of the invention (i.e., mobile terminals, gateways, file servers, shared storage servers) are encoded and provided in the form of computer programs. A computer system executes such programs to provide the functional elements of the present invention. Those programs are stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs may also be possible, in which case several master program files are made available on a server computer for downloading to other computers via a network.

Each computer involved in the proposed system stores necessary software components in its local storage unit, which have previously been installed from a portable storage media or downloaded from a server computer. The computers execute programs read out of their local storage unit, thereby performing the programmed functions. As an alternative way of program execution, the computers may execute programs, reading out program codes directly from a portable storage medium. Another alternative method is that the computers dynamically download programs from a server computer when they are demanded and execute them upon delivery.

CONCLUSION

To summarize the above discussions, the present invention uses a secure communication path to connect a mobile terminal to a gateway placed between a secure network and an external network. The external network offers a wide bandwidth for transferring data between the gateway and another communication device on that network. The present invention enables the gateway to authenticate the communication device by sending a first key from the gateway to the communication device via the mobile terminal and receiving a second key back from the communication device also via the mobile terminal. That is, the two keys are exchanged over a narrow but secure communication path involving the mobile terminal, while the actual data transfer takes place over the broadband external network. In this way, the mobile terminal is used to remotely control a process of transferring a large amount of data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile terminal comprising:
   a communication controller that establishes a secure communication path to a gateway;
   a connection request router that receives from another mobile terminal a connection request carrying a data identifier specifying specific data, saves the data identifier in a memory space, and forwards the connection request to the gateway;
   a first key router that forwards a first key from the gateway to said another mobile terminal for use in access to the data corresponding to the data identifier;
   a second key router that forwards a second key from said another mobile terminal to the gateway, the second key being originally produced by a device that will make access to the data corresponding to the data identifier; and
   a data download commander that retrieves the data identifier from the memory space and sends a data download command including the retrieved data identifier to said another mobile terminal, in response to a notice from the gateway indicating that the gateway has finished registration of the second key.

2. A mobile terminal comprising:
   a communication controller that establishes a secure communication path to a gateway;
   a key generator that produces a key;
   a data upload commander that receives from another mobile terminal a file request including a data identifier specifying specific data, receives the key from the key generator, and sends a data download command to the gateway, together with the key, to initiate a transfer of the data specified by the data identifier up to a storage server; and
   a data download commander that sends a data download command including the data identifier and the key to said another mobile terminal to initiate access to the data that has been uploaded to the storage server.

3. A gateway disposed between a secure network and an external network to control access from the external network to the secure network, the gateway comprising:
   a communication controller that establishes a secure communication path to reach a mobile terminal attached to the external network;
   a key data memory storing key data for use in access to a file server located within the secure network;
   a first key issuer that produces a first key in response to a connection request from the mobile terminal, and sends the produced first key to the mobile terminal, as well as saving the produced first key in the key data memory;
   a second key receiver that receives from the mobile terminal a second key that has been issued by a communication device on the external network, saves the received second key in the key data memory in association with the first key, and sends a registration completion notice to the mobile terminal; and
   a file request router that forwards a file request containing two keys from the communication device to the file server if the first and second keys stored in the key data memory match with the two keys contained in the file request.

4. The gateway according to claim 3, wherein:
   the connection request contains a device ID specifying a device that is to make access to the file server;
   the first key issuer saves the produced first key in the key data memory in association with the device ID contained in the connection request;
   the file request router extracts the device ID of the communication device from the file request and determines whether the first and second keys stored in association with the extracted device ID match with the two keys contained in the file request, before forwarding the file request to the file server.

5. The gateway according to claim 3, wherein:
   the first key issuer gives an expiration date to the first key and saves the first key in the key data memory, together with the expiration date thereof;
   the second key comes with an expiration date, and the second key receiver saves the received second key in the key data memory, including the expiration date thereof; and
   the file request router forwards the file request to the file server only when the expiration dates of the first and second keys are not reached.

6. A non-transitory computer-readable medium storing a program for remotely controlling a data transfer over a network, the program causing a computer to function as:
   a communication controller that establishes a secure communication path to a gateway;
   a connection request router that receives from a mobile terminal a connection request carrying a data identifier specifying specific data, saves the data identifier in a memory space, and forwards the connection request to the gateway;
   a first key router that forwards a first key from the gateway to the mobile terminal for use in access to the data corresponding to the data identifier;
   a second key router that forwards a second key from the mobile terminal to the gateway, the second key being originally produced by a device that will make access to the data corresponding to the data identifier; and
   a data download commander that retrieves the data identifier from the memory space and sends a data download command including the retrieved data identifier to the mobile terminal, in response to a notice from the gateway indicating that the gateway has finished registration of the second key.

7. A non-transitory computer-readable medium storing a program for remotely controlling a data transfer over a network, the program causing a mobile terminal to function as:
   a communication controller that establishes a secure communication path to a gateway;
   a key generator that produces a key;
   a data upload commander that receives from another mobile terminal a file request including a data identifier specifying specific data, receives the key from the key generator, and sends a data download command to the gateway, together with the key, to initiate a transfer of the data specified by the data identifier up to a storage server; and a data download commander that sends a data download command including the data identifier and the produced key to said another mobile terminal to initiate access to the data that has been uploaded to the storage server.

8. A non-transitory computer-readable medium storing a program for controlling access to a secure network, the program causing a computer disposed between the secure network and an external network to function as a gateway comprising:
a communication controller that establishes a secure communication path to reach a mobile terminal attached to the external network;
a key data memory storing key data for use in access to a file server located within the secure network;
a first key issuer that produces a first key in response to a connection request from the mobile terminal, and sends the produced first key to the mobile terminal, as well as saving the produced first key in the key data memory;
a second key receiver that receives from the mobile terminal a second key that has been issued by a communication device on the external network, saves the received second key in the key data memory in association with the first key, and sends a registration completion notice to the mobile terminal; and
a file request router that forwards a file request containing two keys from the communication device to the file server if the first and second keys stored in the key data memory match with the two keys contained in the file request.

9. A method for use by a mobile terminal to remotely control a data transfer over a network, the method comprising:
establishing a secure communication path to a gateway;
receiving from another mobile terminal a connection request carrying a data identifier specifying specific data, saving the data identifier in a memory space, and forwarding the connection request to the gateway;
forwarding a first key from the gateway to said another mobile terminal for use in access to the data corresponding to the data identifier;
forwarding a second key from said another mobile terminal to the gateway, the second key being originally produced by a device that will make access to the data corresponding to the data identifier; and
retrieving the data identifier from the memory space and sending a data download command including the retrieved data identifier to said another mobile terminal, in response to a notice from the gateway indicating that the gateway has finished registration of the second key.

10. A method for use by a mobile terminal to remotely control a data transfer over a network, the method comprising:
establishing a secure communication path to a gateway;
producing a key;
receiving from another mobile terminal a file request including a data identifier specifying specific data;
in response to the file request, sending a data upload command to the gateway, together with the key, to initiate a transfer of the data specified by the data identifier up to a storage server; and
sending a data download command including the data identifier and the key to said another mobile terminal to initiate access to the data that has been uploaded to the storage server.

11. A method for use with a gateway disposed between a secure network and an external network to control access from the external network to the secure network, the method comprising:
establishing a secure communication path to reach a mobile terminal attached to the external network;
producing a first key in response to a connection request from the mobile terminal, and sending the produced first key to the mobile terminal, as well as saving the produced first key in a memory space;
receiving from the mobile terminal a second key that has been issued by a communication device on the external network;
storing the received second key in the memory space in association with the first key and thus sending a registration completion notice to the mobile terminal; and
forwarding a file request containing two keys from the communication device to the file server if the first and second keys stored in the memory space match with the two keys contained in the file request.

12. A data transfer system for transferring data, the data transfer system comprising:
a first mobile terminal;
a second mobile terminal coupled to the first mobile terminal;
a first gateway coupled to data source storing data to be transferred and the first mobile terminal; and
a second gateway coupled to the first gateway; and the second mobile terminal;
wherein:
(a) the first mobile terminal comprises:
a communication controller that establishes a secure communication path to the first gateway,
a connection request router that receives from the second mobile terminal a connection request carrying a data identifier specifying the data to be transferred, saves the data identifier in a memory space, and forwards the connection request to the first gateway,
a first key router that forwards a first key from the first gateway to the second mobile terminal for use in access to the data corresponding to the data identifier,
a second key router that forwards a second key from the second mobile terminal to the first gateway, and
a data download commander that retrieves the data identifier from the memory space and sends a data download command including the retrieved data identifier to the second mobile terminal, in response to a notice from the first gateway indicating that the first gateway has finished registration of the second key;
(b) the first gateway comprises:
a key data memory,
a first key issuer that produces the first key in response to a connection request from the first mobile terminal and sends the produced first key to the first mobile terminal, as well as saving the produced first key in the key data memory,
a second key receiver that receives a second key from the first mobile terminal, saves the received second key in the key data memory in association with the first key, and sends a registration completion notice to the first mobile terminal, and
a file request router that forwards a file request containing two keys from the second gateway to the data source if the first and second keys stored in the key data memory match with the two keys contained in the file request;

(c) the second mobile terminal comprises:

a communication controller that establishes a secure communication path to the second gateway, a connection request issuer that issues the connection request to the first mobile terminal, a first key router that forwards the first key from the first mobile terminal to the second gateway, a second key router that forwards the second key from the second gateway to the first mobile terminal, and a data download command router that forwards the data download command from the first mobile terminal to the second gateway; and (d) the second gateway comprises:

a first key receiver that receives and saves the first key data from the second mobile terminal, a second key issuer that produces and sends the second key to the second mobile terminal upon receipt of the first key from the second mobile terminal, and a file request sender that sends, upon receipt of the data download command from the first mobile terminal, the file request to the first gateway, the file request containing, as said two keys, the first key received from the second mobile terminal and the second key produced by the second key issuer.

* * * * *